(12) United States Patent
Niitsuma

(10) Patent No.: US 8,985,492 B2
(45) Date of Patent: Mar. 24, 2015

(54) DUAL-BEARING REEL SPOOL BRAKE DEVICE AND DUAL-BEARING REEL

(71) Applicant: Shimano Inc., Sakai, Osaka (JP)

(72) Inventor: Akira Niitsuma, Osaka (JP)

(73) Assignee: Shimano Inc., Osaka (JP)

( * ) Notice: Subject to any disclaimer, the term of this patent is extended or adjusted under 35 U.S.C. 154(b) by 140 days.

(21) Appl. No.: 13/728,275

(22) Filed: Dec. 27, 2012

(65) Prior Publication Data

US 2013/0181081 A1   Jul. 18, 2013

(30) Foreign Application Priority Data

Jan. 18, 2012   (JP) .................................. 2012-007762

(51) Int. Cl.
  *A01K 89/01*   (2006.01)
  *A01K 89/033*   (2006.01)
  *A01K 89/0155*   (2006.01)

(52) U.S. Cl.
  CPC ............ *A01K 89/033* (2013.01); *A01K 89/0155* (2013.01)
  USPC ...................................... 242/289; 188/181 A

(58) Field of Classification Search
  USPC ...................................... 242/289; 188/181 A
  See application file for complete search history.

(56) References Cited

U.S. PATENT DOCUMENTS

| | | | | |
|---|---|---|---|---|
| 2,967,676 A * | 1/1961 | Klingberg | ...................... | 242/289 |
| 4,390,140 A * | 6/1983 | Karlsson et al. | ............... | 242/289 |
| 4,601,438 A * | 7/1986 | Young | ............................ | 242/289 |
| 5,692,693 A * | 12/1997 | Yamaguchi | .................... | 242/288 |
| 5,865,387 A * | 2/1999 | Hirano | ........................... | 242/289 |
| 5,996,921 A * | 12/1999 | Hogaki et al. | ................. | 242/289 |
| 6,196,485 B1 * | 3/2001 | Sato | .............................. | 242/289 |
| 6,254,021 B1 * | 7/2001 | Morimoto et al. | ............. | 242/289 |
| 6,371,396 B1 * | 4/2002 | Kawasaki | ..................... | 242/289 |
| 6,481,657 B1 * | 11/2002 | Oishi et al. | ..................... | 242/289 |
| 6,959,886 B1 * | 11/2005 | Rho | ................................ | 242/289 |
| 8,534,585 B2 * | 9/2013 | Saito et al. | ..................... | 242/289 |
| 2008/0257997 A1 * | 10/2008 | Rho | ............................. | 242/289 |

FOREIGN PATENT DOCUMENTS

JP    H11-299402 A    11/1999
JP    2000-245314 A    9/2000

* cited by examiner

*Primary Examiner* — Emmanuel M Marcelo
(74) *Attorney, Agent, or Firm* — Global IP Counselors

(57) ABSTRACT

A dual-bearing reel spool brake device configured to brake a spool being rotatably mounted to a reel unit by centrifugal force is provided. The dual-bearing reel spool break device includes a rotary member, a brake shoe, and a brake drum. The rotary member is configured to be rotated in conjunction with at least rotation of the spool in a fishing-line releasing direction. The brake shoe is elastically engaged with the rotary member, wherein the brake shoe is pivotable and detachable with the rotary member. The brake drum is disposed radially inwards or radially outwards of the brake shoe, wherein the brake drum has a peripheral surface contactable with the brake shoe.

14 Claims, 15 Drawing Sheets

US 8,985,492 B2

DUAL-BEARING REEL SPOOL BRAKE DEVICE AND DUAL-BEARING REEL

CROSS-REFERENCE TO RELATED APPLICATIONS

This application claims priority to Japanese Patent Application No. 2012-007762 filed on Jan. 18, 2012. The entire disclosure of Japanese Patent Application No. 2012-00762 is hereby incorporated herein by reference.

BACKGROUND OF THE INVENTION

1. Field of the Invention

The present invention relates to a brake device, particularly to a dual-bearing reel spool brake device configured to brake a spool rotatably mounted in a reel unit, and further relates to a dual-bearing reel.

2. Background Art

In dual-baring reels to be used for casting, braking force is generally applied to a spool for preventing backlash that is caused when the rotation speed of the spool becomes faster than the fishing-line releasing speed in casting. Spool brake devices are thus configured to apply braking force to spools, and some of them are well known to brake the spool by centrifugal force generated by spool rotation and be able to regulate braking force from the outside of the reel units.

Some of the well-known spool brake devices include a brake drum that is mounted in the reel unit while being able to be located in a plurality of axial positions (see e.g., Japan Laid-open Patent Application Publication Nos. JP-A-H11-299402 (see especially FIG. 6) and JP-A-2000-245314). In the spool brake device of the publication No. JP-A-H11-299402, brake shoes are configured to be rotated in conjunction with spool rotation and make contact with the outer peripheral surface of the brake drum. The outer peripheral surface of the brake drum is tapered while the diameter thereof is reduced towards the spool. By a moving mechanism, the brake drum can be located in a plurality of positions along the axial direction of a spool shaft. The brake shoes are pivotable about axes arranged skew to the spool shaft In the spool brake device of the publication No. JP-A-H11-299402, each brake shoe is pivotably supported by a pin disposed on a bracket fixed to the spool shall. Each brake shoe makes contact with the tapered surface of the brake drum at the tip thereof that is movable radially inwards. In the spool brake device, braking force can be regulated with a variety of levels by the contact of the brake shoes with the outer peripheral surface of the brake drum.

Further, another one of the well-known spool brake devices has a structure that a brake drum is disposed on the outer peripheral side of pivotable brake shoes (see the publication No. JP-A-2000-245314). In the spool brake device of the publication No. JP-A-2000-245314, the brake drum has a cylindrical shape and is axially moved by a moving mechanism. The brake shoes are retained by a locking plate fixed to a rotary member by a screw.

In the spool brake device of the publication No. JP-A-H11-299402, the brake shoes are pivotably supported by the pins disposed on the bracket fixed to the spool shaft. Therefore, the brake shoes cannot be easily replaced.

In the spool brake device of the publication No. JP-A-2000-245314, the pivotable brake shoes are retained by the locking plate fixed to the rotary member by a screw. Therefore, a tool is required for replacing the brake shoes. Thus, the brake shoes cannot be easily replaced similarly to the spool brake device of the publication No. JP-A-H11-299402.

SUMMARY

When the brake shoes cannot be replaced, braking characteristic cannot be changed depending on a situation on a fishing site by differently setting the mass of the brake shoes. Further, a maintenance work (e.g., replacement of the brake shoes due to abrasion) cannot be easily executed.

It is an advantage of the present invention to easily replace a brake shoe that is pivotably disposed in a spool brake device.

A dual-bearing reel spool brake device configured to brake a spool being rotatably mounted to a reel unit by centrifugal force is provided. The dual-bearing reel spool break device includes a rotary member, a brake shoe, and a brake drum. The rotary member is configured to be rotated in conjunction with at least rotation of the spool in a fishing-line releasing direction. The brake shoe is elastically engaged with the rotary member, wherein the brake shoe is pivotable and detachable with the rotary member. The brake drum is disposed radially inwards or radially outwards of the brake shoe, wherein the brake drum has a peripheral surface contactable with the brake shoe.

BRIEF DESCRIPTION OF THE DRAWINGS

Referring now to the attached drawings which form a part of this original disclosure.

DETAILED DESCRIPTION OF THE EMBODIMENTS

Figure 1:
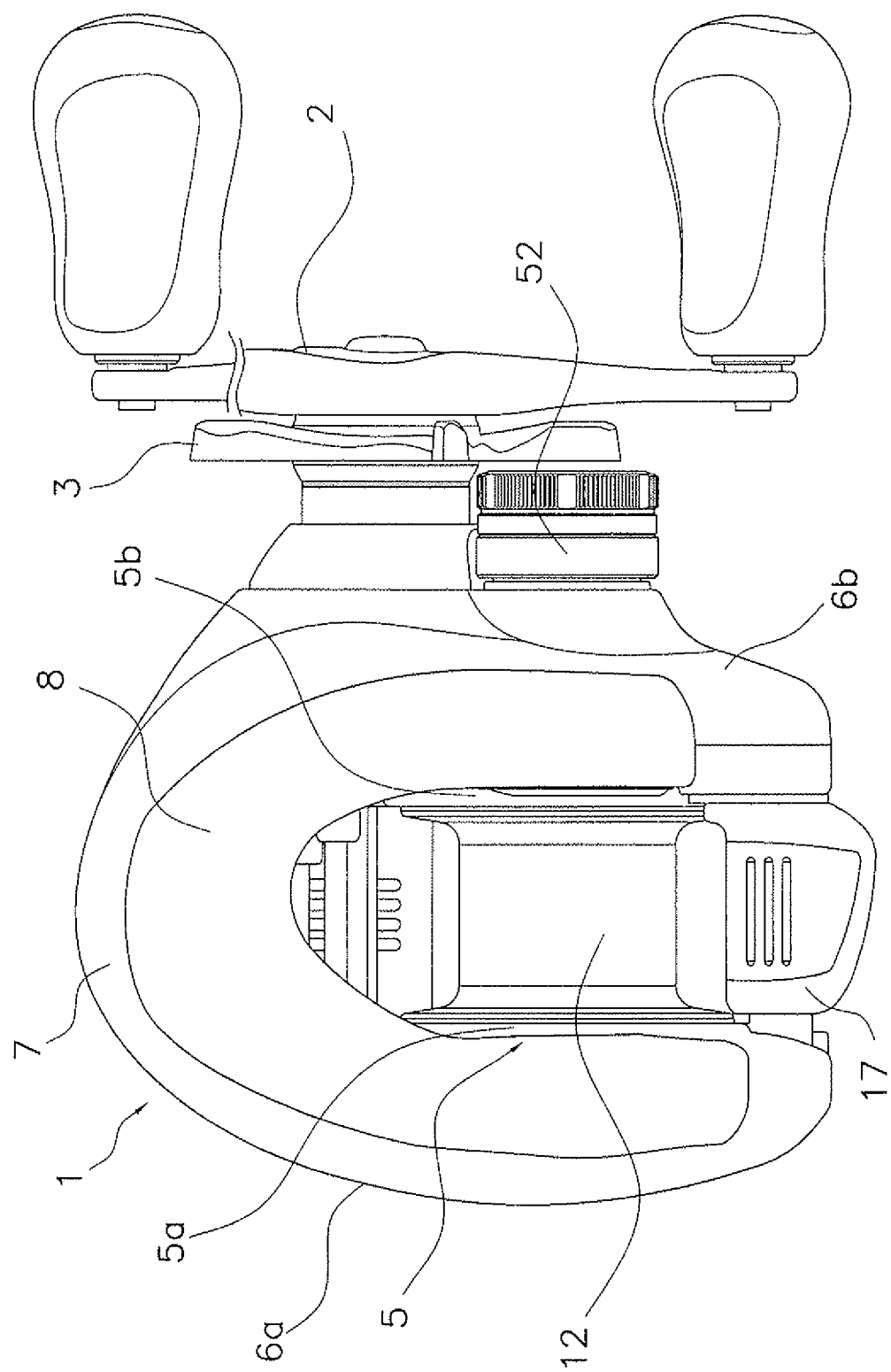
FIG. 1 is a plan view of a dual-bearing reel according to an exemplary embodiment of the present invention.
Figure 2:
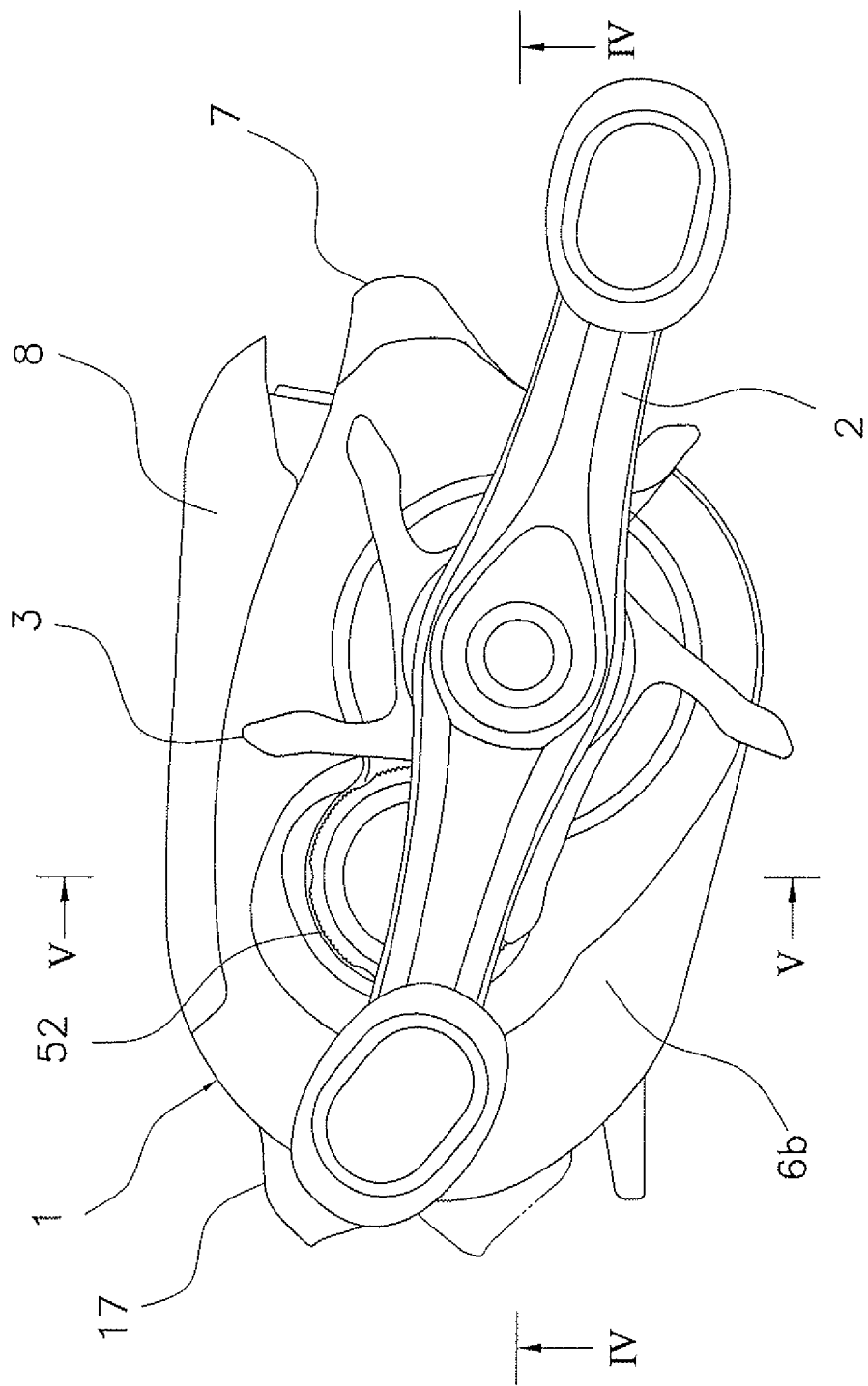
FIG. 2 is a left side view of the dual-bearing reel.
Figure 3:
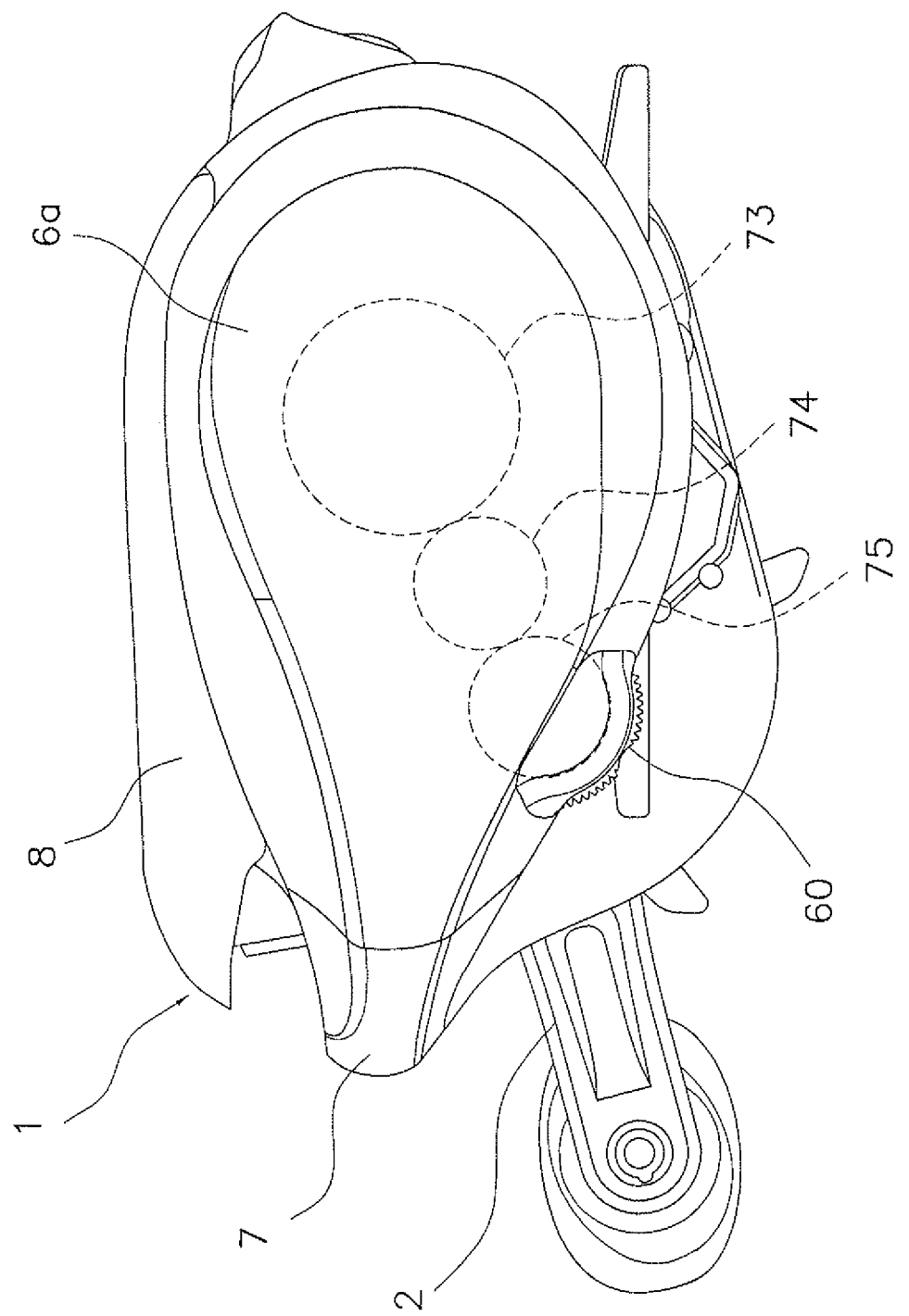
FIG. 3 is a right side view of the dual-bearing reel.

As illustrated in FIGS. 1, 2 and 3, a dual-bearing reel employing a first exemplary embodiment of the present invention is a low-profile small bait-casting reel. The dual-bearing reel includes a reel unit 1, a handle 2, and a star drag 3. The handle 2 is disposed laterally to the reel unit 1 for rotating a spool. The star drag 3 is disposed on the reel unit 1 side of the handle 2 for regulating drag force.

Reel Unit

Figure 4:
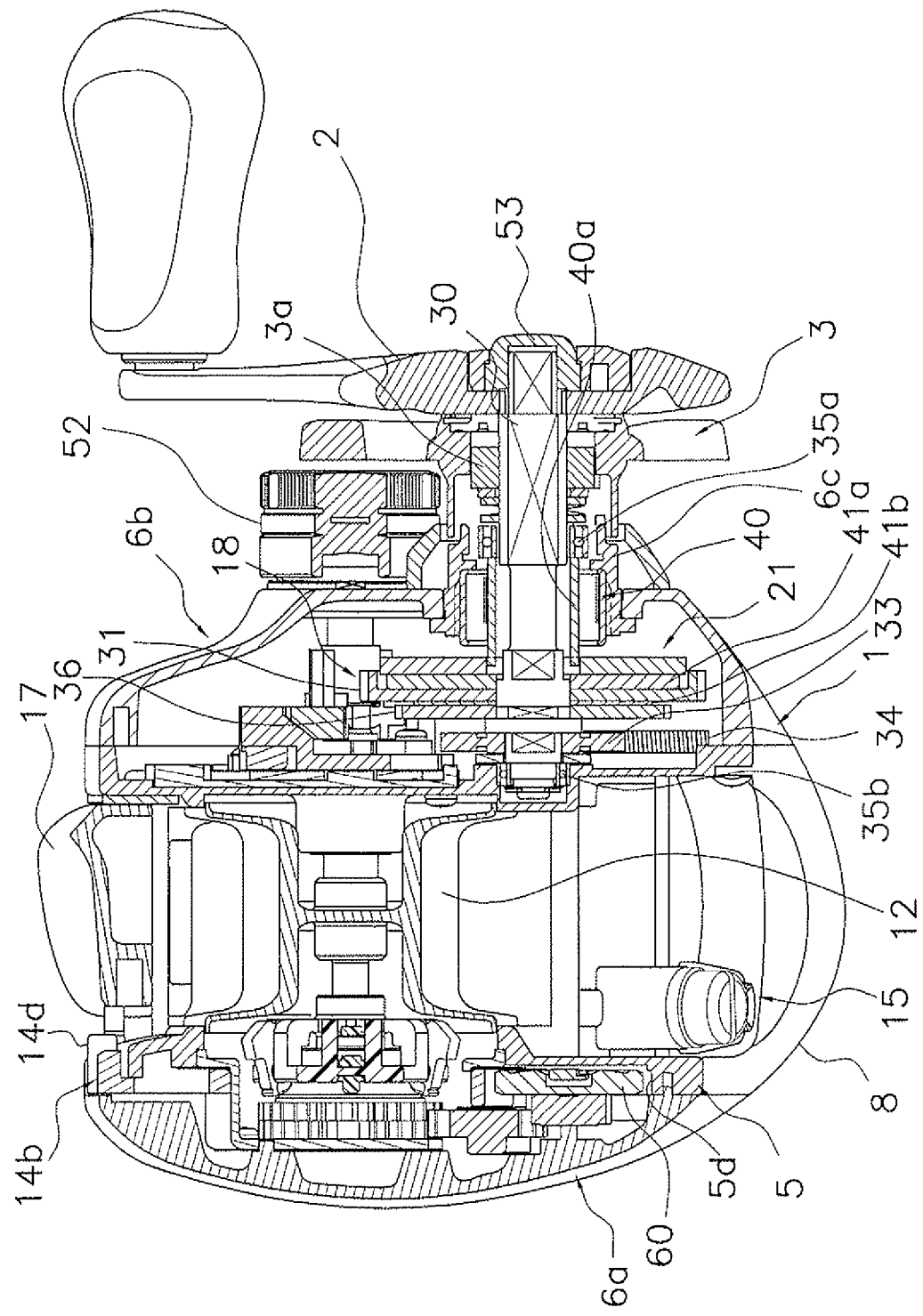
FIG. 4 is a cross-sectional view of FIG. 2 sectioned along a cutting line IV-IV.
Figure 5:
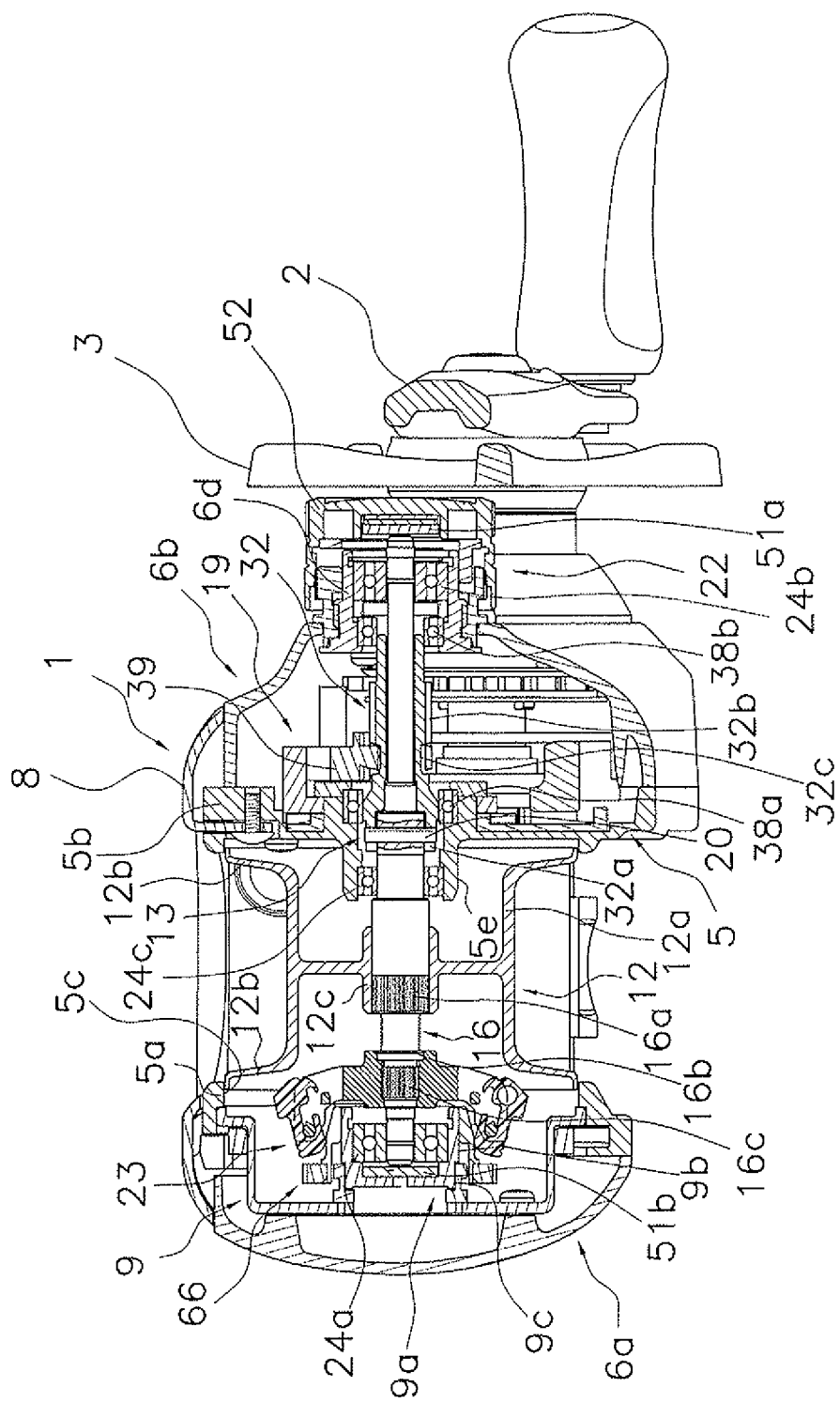
FIG. 5 is a cross-sectional view of FIG. 2 sectioned along a cutting line V-V.

As illustrated in FIGS. 4 and 5, the reel unit 1 includes a frame 5, a first side cover 6a, and a second side cover 6b. The first and second side covers 6a and 6b are attached to the both lateral sides of the frame 5. As illustrated in FIGS. 1, 2, and 3, the reel unit 1 further includes a front cover 7 and a thumb rest 8. The front cover 7 covers the front side of the reel unit 1 whereas the thumb rest 8 covers the top side of the reel unit 1. As illustrated in FIG. 5, the reel unit 1 yet further includes a shall support part 9 to be screwed to the first side cover 6a. A spool 12 is rotatably and detachably mounted inside the reel unit 1 for winding a fishing line.

The frame 5 includes a pair of a first side plate 5a and a second side plate 5b and a plurality of coupling portions (not illustrated in the figures). The first and second side plates 5a and 5b are disposed while being opposed at a predetermined interval. The coupling portions couple the first side plate 5a and the second side plate 5b. The first side plate 5a has a first opening 5c (see FIG. 5) for allowing the spool 12 to pass therethrough. As illustrated in FIG. 4, the first side plate 5a further has a roughly rectangular shaped second opening 5d in a front lower part thereof. The second opening 5d is formed for exposing therethrough the outer peripheral part of an operating member 60 at the front lower part of the first side plate 5a. The operating member 60 serves to regulate braking force of a spool brake mechanism 23 to be described.

The first side cover 6a is supported by the rear part of the first side plate 5a and that of the second side plate 5b while being rotatable and axially movable. The first side cover 6a can be opened and closed by an open/close mechanism 14 illustrated in FIG. 8.

The open/close mechanism 14 includes an open/close shaft 14a and an open/close operating part 14b. The open/close shaft 14a is fixed at its base end to the first side cover 6a. The open/close operating part 14 is attached to the shaft support part 9 while being rotatable between a locked position and an unlocked position. The open/close shaft 14a is rotatably attached to the first side plate 5a and the second side plate 5b. The open/close shaft 14a penetrates the second side plate 5b while the tip thereof is disposed inside the second side cover 6b. An urging member (not illustrated in the figures), which is formed by a coil spring, for instance, is disposed onto the tip of the open/close shaft 14a. The open/close shaft 14a is urged by the urging member in the opening direction of the first side cover 6a.

The open/close operating part 14b has a plurality of protrusions 14c to be engaged with the first side plate 5a. The protrusions 14c are formed on the outer peripheral portion of the open/close operating part 14b while being protruding radially outwards. The protrusions 14c are engaged with the first side plate 5a by a bayonet structure. The open/close operating part 14b further has an open/close lever 14d for an open/close operation on the outer peripheral portion thereof. When the open/close operating part 14b is located in the locked position, the protrusions 14c are engaged with the first side plate 5a. The first side cover 6a is thereby fixed to the first side plate 5a. In contrast, when the open/close operating part 14b is located in the unlocked position, the protrusions 14c are unfastened from the first side plate 5a and the open/close shaft 14a urged by the urging member is protruding from the first side plate 5a. The first side cover 6a is accordingly opened.

The second side cover 6b is screwed to the second side plate 5h. The second side cover 6b has a first boss 6c (see FIG. 4) and a second boss 6d (see FIG. 5). The first boss 6c is provided for supporting a drive shaft 30 (to be described) to which the handle 2 is coupled. The second boss 6d is provided for supporting a spool shaft 16 to which the spool 12 is fixed. The spool shaft 16 is an exemplary rotary shaft of the spool.

The front cover 7 and the thumb rest 8 are screwed to the frame 5. As illustrated in FIG. 5, the shaft support part 9 is a closed-end tubular member. The shaft support part 9 has a tubular bearing accommodating portion 9a on the inner peripheral portion thereof. The bearing accommodating portion 9a accommodates a first bearing 24a in the inside thereof. The first bearing 24a supports an end of the spool shaft 16. The bearing accommodating portion 9a has a first outer peripheral surface 9b and a second outer peripheral surface 9c. The first outer peripheral surface 9b is a large-diameter surface disposed on the spool 12 side, whereas the second outer peripheral surface 9c is a small-diameter surface disposed on the first side cover 6a side.

As illustrated in FIGS. 4 and 5, the spool 12, a level winding mechanism 15, and a clutch operating member 17 are disposed inside the frame 5. The level winding mechanism 15 serves to uniformly wind the fishing line about the spool 12. The clutch operating member 17 functions as a thumb pad in thumbing the fishing line. The clutch operating member 17 is disposed in alignment with the open/close lever 14d. The spool 12 is allowed to pass through the first opening 5c of the first side plate 5a. Further, a gear mechanism 18, a clutch mechanism 13, a clutch control mechanism 19, a drag mechanism 21, and a casting control mechanism 22 are disposed between the frame 5 and the second side cover 6b. The gear mechanism 18 is configured to transmit rotational force from the handle 2 to the spool 12 and the level winding mechanism 15. The clutch control mechanism 19 is configured to engage/disengage and control the clutch mechanism 13 in response to an operation of the clutch operating member 17. The casting control mechanism 22 is a brake mechanism for regulating resistive force to be produced in rotation of the spool 12. Further, the spool brake device 23 is disposed between the frame 5 and the first side cover 6a. The spool brake device 23 is a spool brake device according to an exemplary embodiment of the present invention and serves to inhibit occurrence of backlash in casting.

Spool and Spool Shaft

As illustrated in FIG. 5, the spool 12 has a tubular bobbin trunk 12a, a pair of right and left flanges 12b and a boss 12c. The bobbin trunk 12a is a part that the fishing line is wound about the outer periphery thereof. The flanges 12b are integrally formed on the both axial ends of the bobbin trunk 12a while being protruding radially outwards. The boss 12c is fixed onto the spool shall 16 by an arbitrary fixation method such as press fitting. The spool 12 is thereby coupled to the spool shaft 16 while being unitarily rotatable therewith.

As illustrated in FIG. 5, the spool shaft 16 extends outwards of the second side cover 6b while penetrating the second side plate 5b. One end of the spool shall 16 is rotatably supported by the bearing accommodating portion 9a of the shall support part 9 through the first bearing 24a. On the other hand, the other end of the spool shaft 16 is rotatably supported by a second bearing 24b within the second boss 6d disposed on the second side cover 6b. Further, the intermediate part of the spool shaft 16 is rotatably supported by a boss 5e formed on the second side plate 5b through a third bearing 24c. The spool shaft 16 is thereby supported by the reel unit 1 through bearings disposed in three positions.

An engaging pin 20, which forms a part of the clutch mechanism 13, is fixed to a part of the spool shaft 16, i.e., the part penetrating the second side plate 5b. The engaging pin 20 penetrates the spool shaft 16 along its diameter, while the both ends of the engaging pin 20 are radially protruding from the spool shaft 16. The spool shaft 16 has a first serration 16a on the outer peripheral surface thereof. Specifically, the first serration 16a is formed on a part to which the spool 12 is fixed. The first serration 16a functions as an anti-rotation element in press-fitting the spool 12 onto the spool shaft 16. The spool shaft 16 has a large-diameter brimmed portion 16b formed on the first side cover 6a side of the first serration 16a. The brimmed portion 16b is provided for positioning a rotary member 62 (to be described) of the spool brake device 23. The spool shaft 16 further has a second serration 16c on the outer peripheral surface thereof. Specifically, the second serration 16c is formed on a part disposed on the first side cover 6a side of the brimmed portion 16b. The second serration 16c functions as an anti-rotation element in press-fitting the rotary member 62 onto the spool shaft 16.

Gear Mechanism

As illustrated in FIGS. 4 and 5, the gear mechanism 18 includes the drive shaft 30, a drive gear 31, a pinion gear 32 (see FIG. 5), a first gear 33, and a second gear 34. The handle 2 is coupled to the drive shaft 30 while being unitarily rotatable therewith. The drive gear 31 is attached to the drive shaft 30. The pinion gear 32 is meshed with the drive gear 31. The first gear 33 is coupled to the drive shaft 30 while being unitarily rotatable therewith. The second gear 34 is meshed with the first gear 33. The second gear 34 is provided for reciprocating right and left the level winding mechanism 15 in conjunction with rotation of the handle 2.

The drive shaft 30 is allowed to be rotated only in the fishing-line winding direction by a one-way clutch 40. The drive shaft 30 is rotatably supported by the reel unit 1 through a fourth bearing 35a and a fifth bearing 35b. The fourth bearing 35a is attached to the first boss 6c of the second side cover 6b. The fifth bearing 35b is attached to the second side plate 5b.

Figure 6:
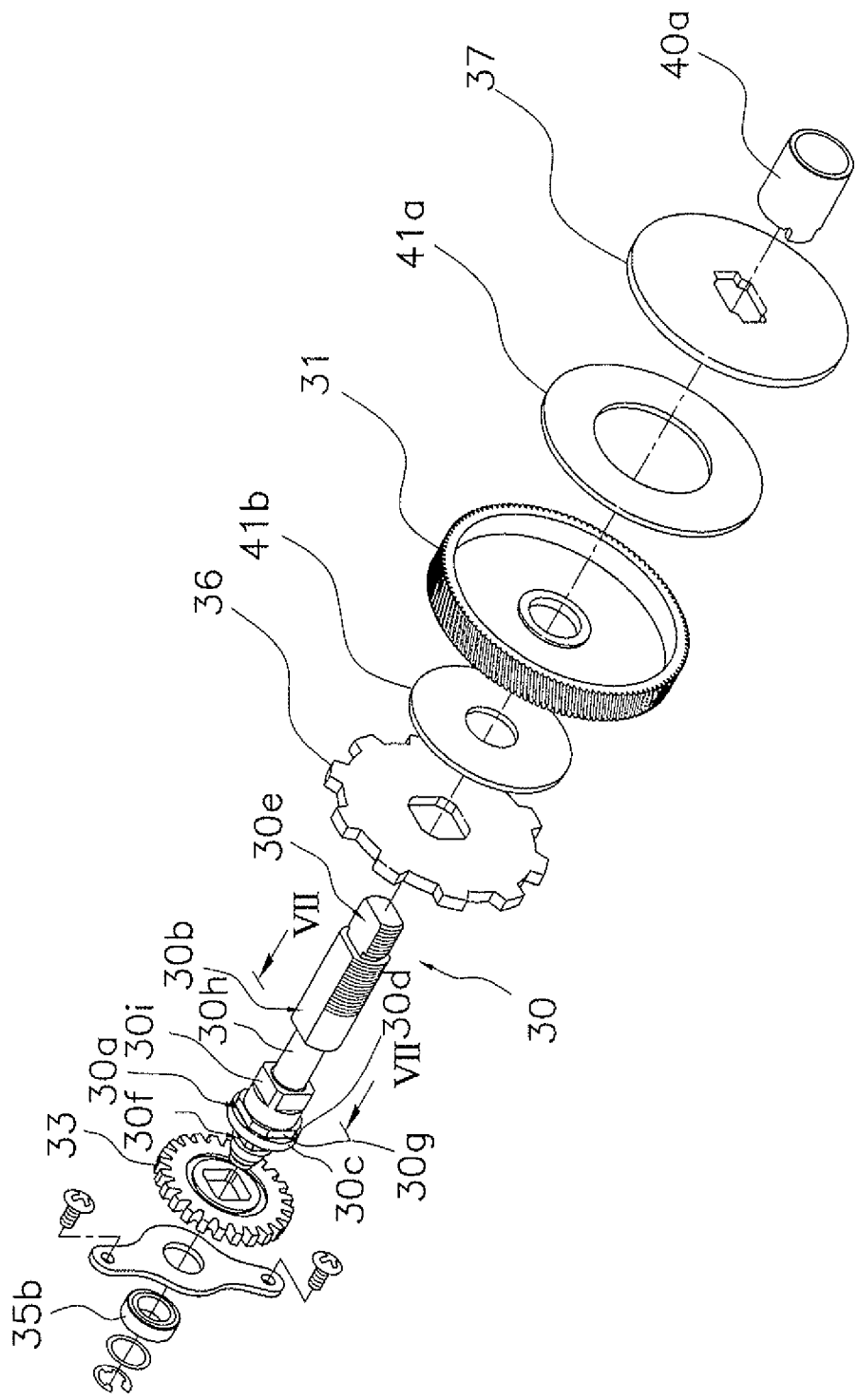
FIG. 6 is an exploded perspective view of a drive shaft and its periphery.

As illustrated in FIG. 6, the drive shaft 30 has a first attachment portion 30a, a second attachment portion 30b, a brimmed portion 30c, and grooves 30d. The second attachment portion 30b is disposed adjacently to the first attachment portion 30a. The brimmed portion 30c is a large-diameter portion that is disposed adjacently to the first attachment portion 30a while being disposed on the opposite side of the second attachment portion 30b through the first attachment portion 30a. The grooves 30d are formed on the brimmed portion 30c. The drive shaft 30 further has a third attachment portion 30e and a fourth attachment portion 30f. The handle 2 is attached to the third attachment portion 30e. The first gear 33 is attached to the fourth attachment portion 30f. In the present exemplary embodiment, the first attachment portion 30a has a diameter greater than that of the second attachment portion 30b.

A ratchet wheel 36, which functions as a drag receiver member for receiving drag force of the drag mechanism 21, is attached to the first attachment portion 30a while being unitarily rotatable therewith. The ratchet wheel 36 is disposed between the drive gear 31 and the brimmed portion 30c. The first attachment portion 30a has four chamfered portions 30g on the outer peripheral surface thereof. The chamfered portions 30g serve to couple the ratchet wheel 36 thereto in a unitarily rotatable state. The ratchet wheel 36 functions not only as the drag receiver member but also as a clutch returning mechanism for returning the clutch mechanism 13 from a clutch-off state to a clutch-on state. The four chamfered portions 30g of the first attachment portion 30a respectively have planes formed at 90-degree intervals along the circumferential direction.

Figure 7:
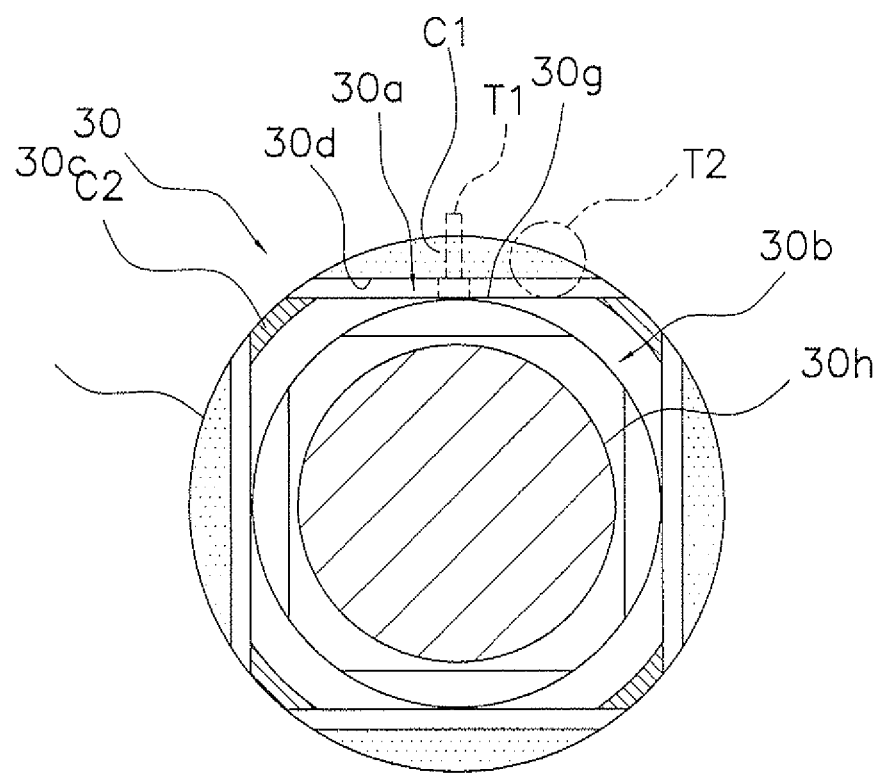
FIG. 7 is a cross-sectional view of FIG. 6 sectioned along a cutting line VII-VII.

The chamfered portions 30g are formed by machining with use of a tip surface of a T-slot tool T1 depicted with a broken line in FIG. 7. The T-slot tool T1 is a tool for processing with the tip surface of a blade portion thereof. In the T-slot tool T1, the blade portion has a diameter greater than that of a shaft portion. In processing the chamfered portions 30g with use of the T-slot tool T1, the T-slot tool T1 digs into the brimmed portion 30c for reliably processing the chamfered portions 30g to the boundary between the brimmed portion 30c and the chamfered portions 30g. Consequently, the grooves 30d are formed at a groove width equal to the axial length of the blade portion of the T-slot tool T1. In processing the first attachment portion 30a with the tip surface of the T-slot tool T1, the grooves 30d are processed on a face of the brimmed portion 30c using the lateral surfaces of the T-slot tool T1. In machining the brimmed portion 30c by a lathe, for instance, a first processed surface C1 (hatched with dots) and a second processed surface C2 (hatched with diagonally right down lines) are left on a part of the face of the brimmed portion 30c, i.e., a part on which no groove 30d is formed. Therefore, the first processed surface C1 and the second processed surface C2 are located in the same axial position.

The first attachment portion has been conventionally formed by machining using the lateral surface of an endmill T2 depicted with a dashed two-dotted line in FIG. 7. The endmill T2 has a large diameter. Therefore, when the first attachment portion is machined with the endmill T2, the first processed surface C1 is processed by the tip surface of the endmill T2 without being left. On the other hand, the second processed surface C2 is left. As a result, the first processed surface C1 processed with the endmill T2 and the second processed surface C2 not processed with the endmill T2 are formed in different axial positions. In this case, when the ratchet wheel 36 is pressed by the star drag 3, chances are that the ratchet wheel 36 is slanted by the step thus formed and the drive gear 31 is also slanted.

However, in the present exemplary embodiment, the first processed surface C1 is left while the grooves 30d are formed. No step is thereby produced on a part making contact with the ratchet wheel 36. Therefore, the ratchet wheel 36 is not slanted even when being pressed. Accordingly, the drive gear 31, which presses the ratchet wheel 36, is less easily slanted and chances become less to cause a defect in meshing of gears attributed to slanting of the drive gear 31.

As illustrated in FIG. 6, the drive gear 31 is rotatably attached onto the second attachment portion 30b. Further, a drag plate 37 of the drag mechanism 21 is attached to the second attachment portion 30b while being unitarily rotatable therewith. Yet further, a drag nut 3a (see FIG. 4) of the star drag 3 is screwed onto the second attachment portion 30b. The second attachment portion 30b has an annular thickness reduced portion 30h formed for reducing the weight of the drive shaft 30. Further, four chamfered portions 30i are axially formed at a predetermined length on the rear side (the left side in FIG. 6) of the thickness reduced portion 30h of the second attachment portion 30b. The drag plate 37 is coupled to the chamfered portions 30i while being unitarily rotatable therewith. The third attachment portion 30e is disposed on the tip side of the second attachment portion 30b. The third attachment portion 30e has a diameter less than that of the second attachment portion 30b. The handle 2 is attached onto the third attachment portion 30e while being unitarily rotatable therewith. Further, a nut 53 (see FIG. 4) is screwed onto the third attachment portion 30e in order to fix the handle 2 to the drive shaft 30. The fourth attachment portion 30f is disposed on the opposite side of the first attachment portion 30a through the brimmed portion 30c. The first gear 33 is attached onto the fourth attachment portion 30f while being unitarily rotatable therewith.

The drive gear 31 has a micro-pitch tooth profile having a module of 0.3 or less. Therefore, meshing of the drive gear 31 with the pinion gear 32 will be deteriorated even when the drive gear 31 is slightly slanted. However, the drive gear 31 is less easily slanted as described above. Therefore, chances become less to cause a defect in meshing of gears.

As illustrated in FIG. 5, the pinion gear 32 is a tubular member that the spool shaft 16 penetrates through the center thereof. The pinion gear 32 is rotatably supported by the reel unit 1. Specifically, one end (the left end in FIG. 5) of the pinion gear 32 is rotatably supported by a sixth bearing 38a attached to the second side plate 5b, while the other end (the right end in FIG. 5) of the pinion gear 32 is rotatably supported by a seventh bearing 38b attached to the second boss 6d of the second side cover 6b. Further, the pinion gear 32 is attached to the reel unit 1 while being movable in the spool shaft direction. The pinion gear 32 has an engaged groove 32a on one end thereof (the left end in FIG. 5). The engaged groove 32a is formed along the diameter of the pinion gear 32. The engaged groove 32a is engaged with the engaging pin 20. Further, the pinion gear 32 has gear teeth 32b on the other end part thereof (the right end part in FIG. 5). The gear teeth 32b are meshed with the drive gear 31. A narrowed portion 32c is formed between the engaged groove 32a and the gear teeth 32b. A clutch yoke 39, which forms a part of the clutch control mechanism 19, is engaged with the narrowed portion 32c. The clutch yoke 39 is configured to be located in an on-position illustrated in FIG. 5 when the clutch operating member 17 is located in a clutch-on position. On the other hand, the clutch yoke 39 is configured to be moved to an off-position located on the right side of the on-position in FIG. 5 when the clutch operating member 17 is located in a clutch-off position. Accordingly, the engaging pin 20 is disengaged from the engaged groove 32a and the clutch mechanism 13 is set to be in the clutch-off state. Therefore, the engaging pin 20 and the pinion gear 32 form the clutch mechanism 11.

The second gear 34 is coupled to a helical shaft (not illustrated in the figures) of the level winding mechanism 15 while being unitarily rotatable therewith.

Drag Mechanism

In the clutch-on state, the drag mechanism 21 is configured to brake rotation of the spool 12 in the fishing-line releasing direction through the drive gear 31. Drag force of the drag mechanism 21 is regulated by the star drag 3. As illustrated in FIGS. 4 and 6, rotation of the handle 2 and the pressing force of the star drag 3 are transmitted to the drag mechanism 21 through an inner race 40a of the one-way clutch 40. The drag mechanism 21 includes the ratchet wheel 36 and the drag plate 37 coupled to the inner race 40a in a unitarily rotatable state. To make the drive gear 31 smoothly slide against adjacent members in drag actuation, a first drag washer 41a is attached between the drag plate 37 and the drive gear 31, while a second drag washer 41b is attached between the drive gear 31 and the ratchet wheel 36. The first and second drag washers 41a and 41b are made of either felt or graphite.

Casting Control Mechanism

The casting control mechanism 22 includes a first friction plate 51a, a second friction plate 51b and a brake cap 52. The first friction plate 51a and the second friction plate 51b are abutted to the both ends of the spool shaft 16 from the axially outside of the spool shaft 16. The brake cap 52 is configured to regulate abutting pressure of the first and second friction plates 51a and 51b against the spool shaft 16. The first friction plate 51a is disposed inside the brake cap 52. The brake cap 52 is screwed onto the outer peripheral surface of the second boss 6d. The second friction plate 51b is attached to the inside of the shaft support part 9.

Spool Brake Device

Figure 8:
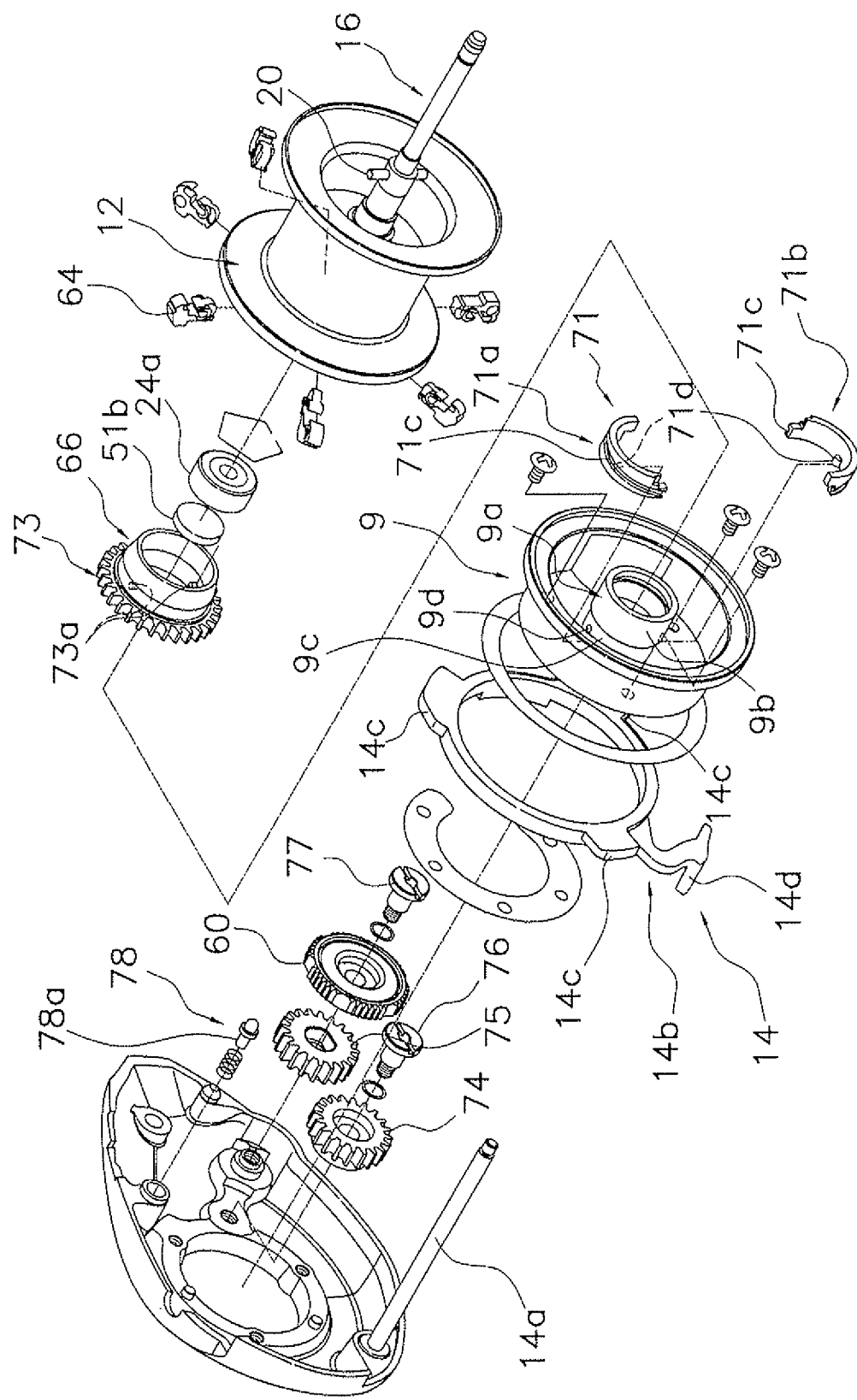
FIG. 8 is an exploded perspective view of a spool brake device.
Figure 9:
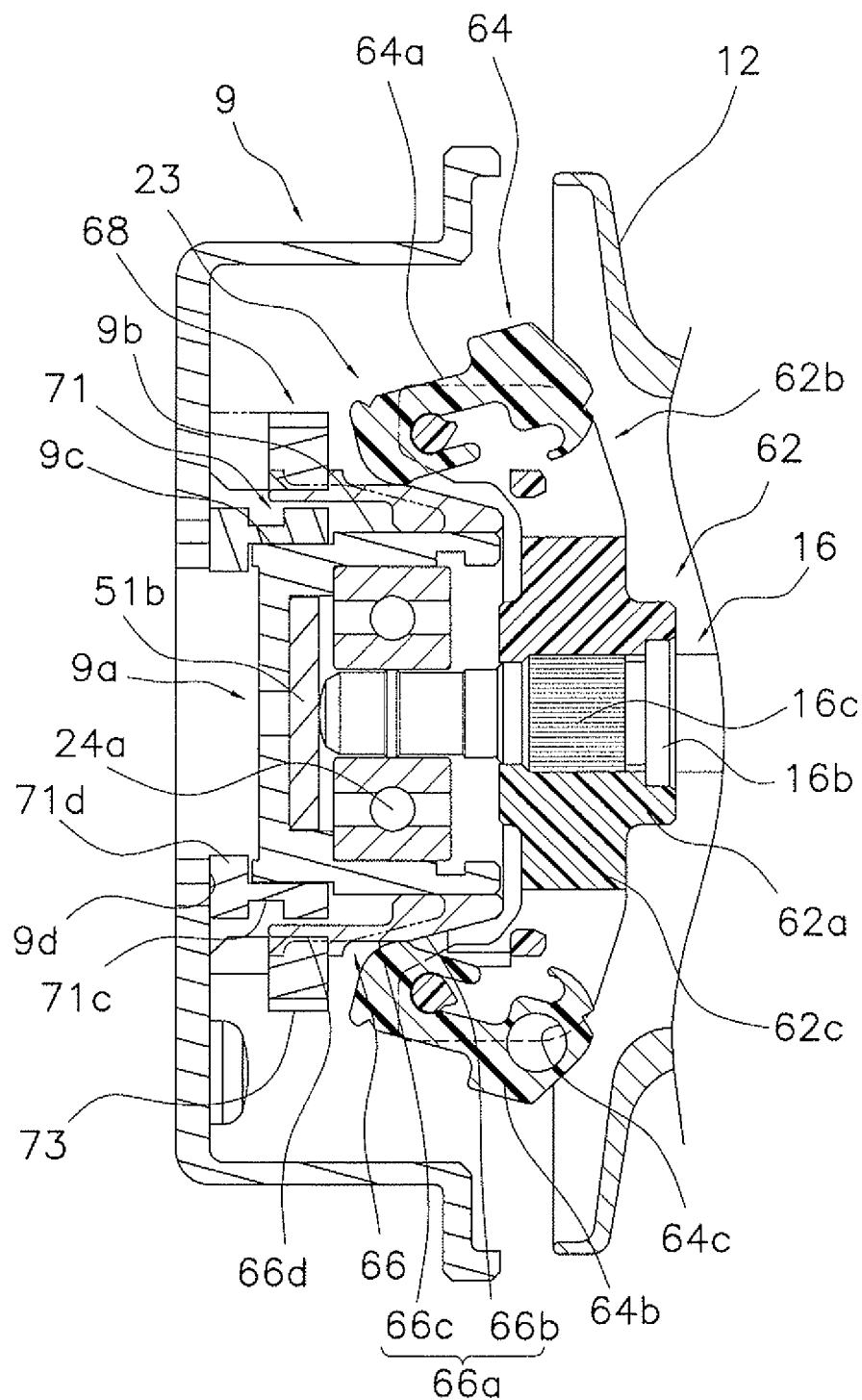
FIG. 9 is a cross-sectional view of the spool brake device.

As illustrated in FIGS. 8 and 9, the spool brake device 23 includes the rotary member 62 (see FIG. 9), a plurality of (e.g., six) brake shoes 64, a brake drum 66, a moving mechanism 68, and an on/off switch mechanism 70 (an exemplary switch mechanism). The spool brake device 23 is mounted to the spool shaft 16 and the shall support part 9. The plural brake shoes 64 are elastically engaged with the rotary member 62 while being pivotable and detachable. The brake drum 66 is disposed radially inwards of the brake shoes 64 and has an outer peripheral surface 66a contactable with the pivotable brake shoes 64. The moving mechanism 68 can position the brake shoes 64 and the brake drum 66 in the axial direction of the spool shaft 16 while the brakes shoes 64 and the brake drum 66 are axially movable relatively to each other.

Rotary Member

The rotary member 62 is a roughly circular member made of synthetic resin (e.g., polyamide resin, polyacetal resin, etc.). The rotary member 62 is configured to be rotated in conjunction with at least rotation of the spool 12 in the fishing-line releasing direction. In the present exemplary embodiment, the rotary member 62 is configured to be rotated in conjunction with rotation of the spool 12 in the fishing-line releasing direction and the fishing-line winding direction. As illustrated in FIG. 9, the rotary member 62 is coupled to the spool shaft 16 by an arbitrary fixation method (e.g., press-fitting) while being unitarily rotatable therewith. In the present exemplary embodiment, the rotary member 62 is fixed to the second serration 16c by press-fitting. The rotary member 62 is axially positioned by the brimmed portion 16b of the spool shaft 16.

Figure 10:
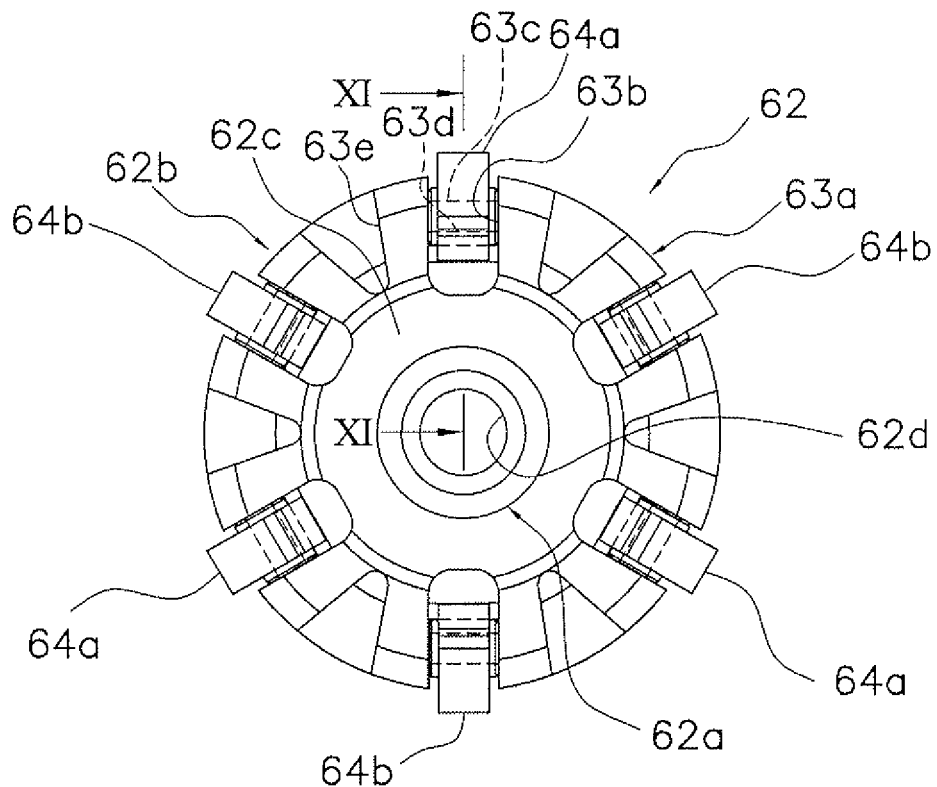
FIG. 10 is a side view of a rotary member to which brake shoes are attached.
Figure 11:
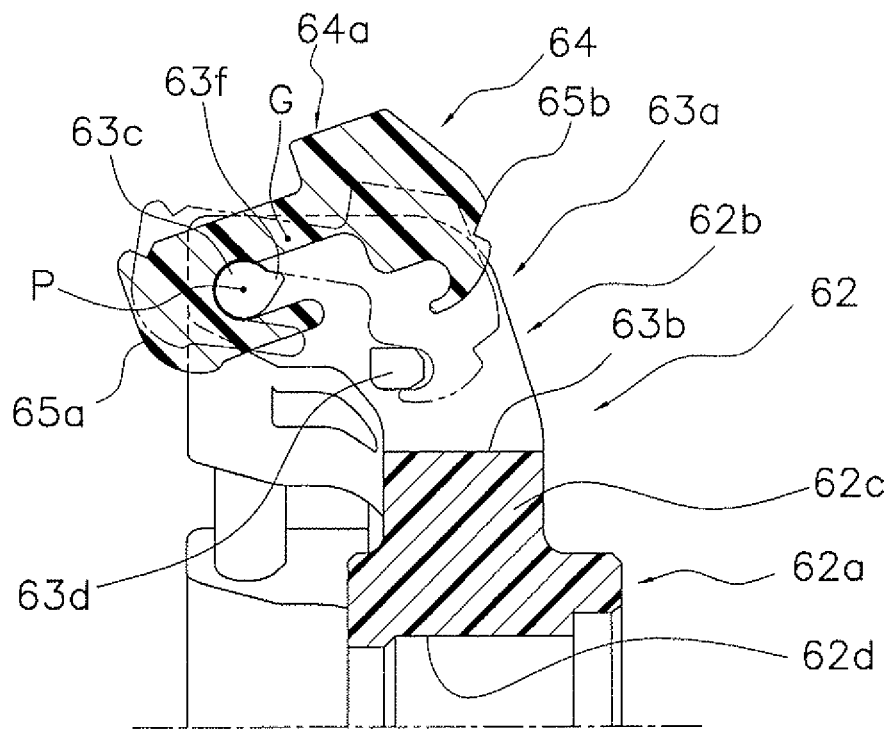
FIG. 11 is a cross-sectional view of FIG. 10 sectioned along a cutting plane XI-XI.

As illustrated in FIGS. 10 and 11, the rotary member 62 includes a boss 62a, a shoe attached portion 62b, and a connecting portion 62c. The inner periphery of the boss 62a is fixed onto to the spool shaft 16. The shoe attached portion 62b is an annular portion with a large thickness and is disposed radially outwards of the boss 62a. The connecting portion 62c connects the boss 62a and the shoe attached portion 62b. The boss 62a is a tubular portion having a stepped through hole 62d that the spool shaft 16 penetrates therethrough. The through hole 62d is axially positioned by the brimmed portion 16b of the spool shaft 16, while being fixed to the second sensation 16c by press-fitting.

The shoe attached portion 62b has a main body 63a, a plurality of (e.g., six) shoe support recesses 63b, a plurality of (e.g., six) pivot shafts 63c, and a plurality of (e.g., six) shoe holders 63d. The main body 63a is a ring-shaped portion with a large thickness. The shoe support recesses 63b are formed in the main body 63a. Each pivot shall 63c is disposed in each shoe support recess 63b. Each shoe holder 63d is disposed in each shoe support recess 63b while being separated away from each pivot shaft 63c at a predetermined interval. The shoe support recesses 63b are disposed at predetermined intervals in the circumferential direction. In the present exemplary embodiment, the shoe support recesses 63b are disposed at equal intervals in the rotational direction of the spool 12. Each shoe support recess 63b is recessed at a predetermined width whereby each brake shoe 64 can be disposed therein. A plurality of thickness reduced portions 63e are formed for reducing the weight of the rotary member 62. Each thickness reduced portion 63e is disposed between adjacent shoe support recesses 63b.

Each pivot shaft 63c is a shaft that each brake shoe 64 is elastically engaged therewith in a pivotable state. The pivot shaft 63c is integrally formed with the shoe support recess 63b along a direction skew to the spool shaft 16. As illustrated in FIG. 11, the pivot shaft 63c includes a restricting protrusion 63f protruding radially outwards from the outer peripheral surface thereof. The restricting protrusion 63f restricts the pivot rage of the brake shoe 64.

The restricting protrusion 63f serves to restrict the brake shoe 64 from pivoting towards the brake drum 66. The restricting protrusion 63f is protruding in a triangular beak shape. The restricting protrusion 63f makes contact with a slit 65d (to be described) of the brake shoe 64 for restricting the brake shoe 64 from pivoting towards the brake drum 66.

The shoe holders 63d form the on/off switch mechanism 70. The on/off switch mechanism 70 is a mechanism configured to switch the brake shoes 64 between an activated state depicted with a solid line in FIG. 11 and a deactivated state depicted with a dashed two-dotted line in FIG. 11. The activated state refers to a state that the brake shoes 64 can make contact with the brake drum 66. The deactivated state refers to a state that the brake shoes 64 cannot make contact with the brake drum 66. The shoe holder 63d is integrally formed with the shoe support recess 63b along a direction skew to the spool shaft 16. The shoe holder 63d has a roughly rectangular cross section.

The connecting portion 62c is a disc-shaped member with a large thickness. The connecting portion 62c is integrally formed with the outer peripheral part of the boss 62a. The main body 63a of the shoe attached portion 62b is integrally formed with the outer peripheral end surface of the connecting portion 62c.

Brake Shoe

For example, the brake shoes 64 are plate-shaped members made of synthetic resin with elasticity (e.g., polyamide resin). As illustrated in FIG. 9, the brake shoes 64 include first brake shoes 64a and second brake shoes 64b. Each second brake shoe 64b has a weight less than that of each first brake shoe 64a. In the present exemplary embodiment, the first brake shoes 64a and the second brake shoes 64b are alternately disposed. However, the arrangement and the number of the first brake shoes 64a and the second brake shoes 64b can be arbitrarily set in accordance with braking characteristics and etc. Except for through holes 64c for mass adjustment, the second brake shoes 64b are basically the same as the first brake shoes 64a. Therefore, the material, the contour shape and etc. of the second brake shoes 64b are the same as those of the first brake shoes 64a. In the following explanation, the first brake shoes 64a will be mainly described.

Figure 12:
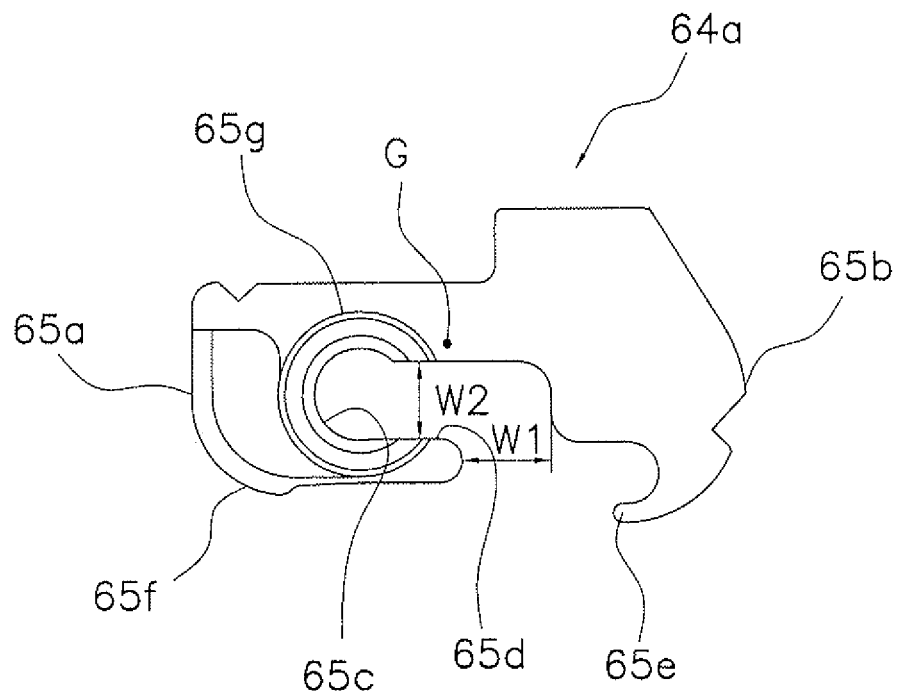
FIG. 12 is a side view of a first brake shoe.
Figure 13:
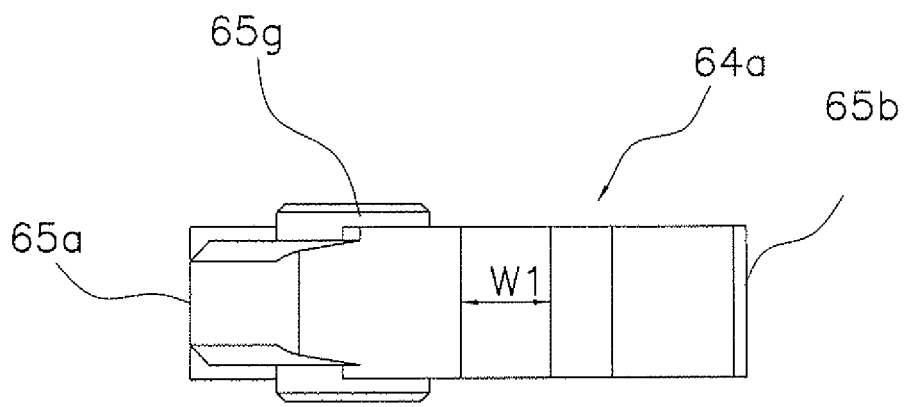
FIG. 13 is a bottom view of the first brake shoe.

As illustrated in FIG. 12, the first brake shoe 64a has a first end 65a and a second end 65b disposed on the opposite side of the first end 65a. The first brake shoe 64a is a plate-shaped member elongated from the first end 65a to the second end 65b. The first brake shoe 64a is coupled to the pivot shaft 63c of the rotary member 62 while being pivotable about a position between the first end 65a and a center-of-gravity G. The first brake shoe 64a has a support hole 65c and the slit 65d. The support hole 65c is fitted onto the pivot shaft 63c. The slit 65d is opened from the inner peripheral surface of the support hole 65c to the outer peripheral surface of the first brake shoe 64a at a width narrower than that of the pivot shaft 63c. The support hole 65c is disposed between the first end 65a and the center-of-gravity G. Further, the first brake shoe 64a further has a holding protrusion 65e. The holding protrusion 65e is disposed on the second end 65b side while being elastically engaged with the shoe holder 63d. The holding protrusion 65e is curved in a circular-arc shape. Therefore, the holding protrusion 65e encloses the shoe holder 63d from three sides when the brake shoe 64 is disposed in the deactivated state. Braking force can be regulated with a more variety of levels by thus changing the number of the brake shoes 64 contactable to the brake drum 66 by the on/off switch mechanism 70.

The support hole 65c is fitted onto the pivot shaft 63c by clearance fit. The slit 65d is bent at 90 degrees in a hook shape. A width W1 of the slit 65d on the opening side is greater than the outer diameter of the pivot shaft 63c. On the other hand, a width W2 of the slit 65d on the support hole 65c side is less than the outer diameter of the pivot shall 63c. Further, the support hole 65c side portion of the slit 65d is formed along the longitudinal direction. Thus, the extended direction of the slit 65d is different from a direction of the force acting on the first brake shoe 64a (i.e., a radially outward direction), while the width W2 of the support hole 65c side portion of the slit 65d is less than the outer contour of the pivot shaft 63c. Therefore, when attached onto the pivot shaft 63c, the first brake shoe 64a is less easily detached therefrom. The first brake shoe 64a has a contact surface 65f on the first end 65a. The contact surface 65f makes contact with the brake drum 66. The contact surface 65f is formed in a circular-arc shape and the width thereof is narrower than the other part of the first brake shoe 64a. A boss 65g is formed on the outer peripheral side of the support hole 65c while being protruding from the both faces of the aforementioned other part of the first brake shoe 64a. The boss 65g is protruding to positions adjacent to the shoe support, recess 63b.

Figure 14:
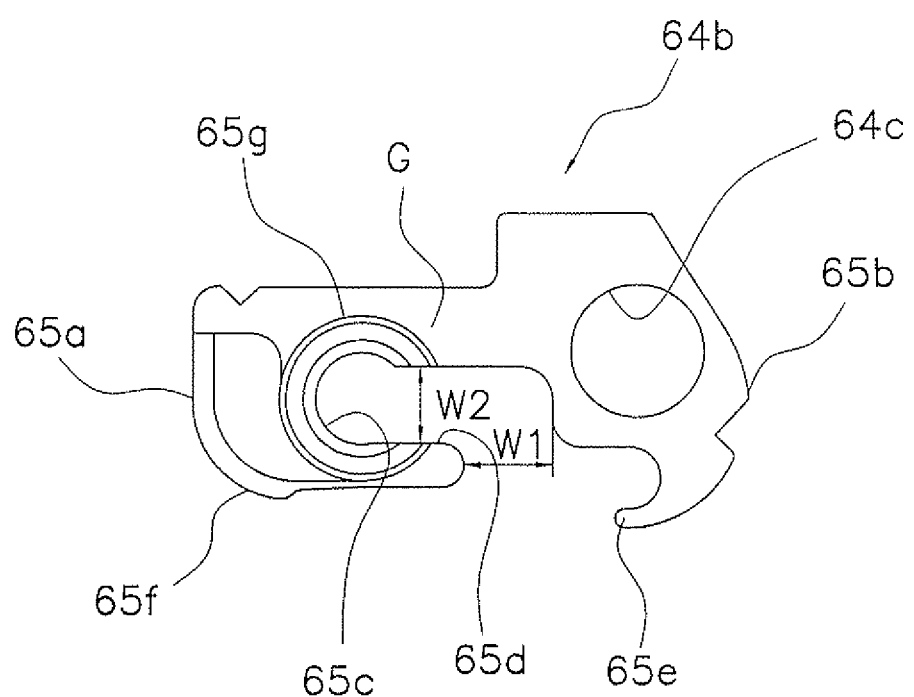
FIG. 14 is a side view of a second brake shoe.

As illustrated in FIG. 14, the second brake shoe 64b has the through hole 64c in addition to the structure of the first brake shoe 64a. A variety of brake shoes with different masses can be obtained by changing the inner diameter of the through hole 64c.

When the spool 12 is rotated, each brake shoe 64 pivots about a pivot axis P in the counterclockwise direction in FIG. 11 by centrifugal force acting on the center-of-gravity G.

Brake Drum

As illustrated in FIGS. 8 and 9, the brake drum 66 is a tubular member disposed radially inwards of the brake shoes 64 and is made of relatively hard metal such as zinc alloy. As illustrated in FIG. 9, the brake drum 66 is attached to the first outer peripheral surface 9b of the bearing accommodating portion 9a of the shaft support part 9 while being rotatable and axially movable. The brake drum 66 has the outer peripheral surface 66a formed by a tapered surface 66b and a parallel surface 66c. The tapered surface 66b and the parallel surface 66c are disposed in this order from the rotary member 62 side closer to the spool 12. In other words, the brake drum 66 has the outer peripheral surface 66a that can make contact with the brake shoes 64 at its portions having different diameters. Each brake shoe 64, which pivots by centrifugal force, makes contact with the tapered surface 66b and the parallel surface 66c at the contact surface 65f formed on the first end 65a thereof. The tapered surface 66b has a shape with a diameter gradually reduced from the parallel surface 66c towards the spool 12. The diameter of a small-diameter side end portion of the tapered surface 66b falls in a range of 85 to 95% of that of a large-diameter side end portion of the tapered surface 66b. In the present exemplary embodiment, the diameter of the small-diameter side end portion is 14.1 mm, while the diameter of the parallel surface 66c is 16.2 mm. Further, the axial length of the tapered surface 66b is 5.5 mm. Therefore, the slant angle of the tapered surface 66b with respect to the parallel surface 66c is, for instance, 20.8 degrees.

The brake drum 66 has an attached surface 66d on the first side cover 6a side. A first gear member 73, which forms a part of the moving mechanism 68, is attached onto the attached surface 66d. The first gear member 73 is fixed onto the attached surface 66d by an arbitrary fixation method (e.g., press-fitting, contact, etc.) while being unitarily rotatable therewith.

Moving Mechanism

The moving mechanism 68 is a mechanism configured to axially move and position the brake shoes 64 and the brake drum 66. As illustrated in FIG. 8, the moving mechanism 68 includes the operating member 60, a brake cam 71, the first gear member 73, a second gear member 74 meshed with the first gear member 73, and a third gear member 75 that is meshed with the second gear member 74 while being unitarily rotatable with the operating member 60.

The operating member 60 is a disc-shaped member made of synthetic resin. The operating member 60 is disposed while the outer peripheral part thereof is exposed to the outside through the second opening 5d of the first side plate 5a. The brake cam 71 is a ring-shaped member made of, for instance, polyacetal resin. The brake cam 71 is divided into two semicircular members, i.e., a first divided member 71a and a second divided member 71b. The brake cam 71 is attached onto the second outer peripheral surface 9c of the bearing accommodating portion 9a while being non-rotatable and axially immovable. Each of the first and second divided members 71a and 71b has a helical cam groove 71c formed on the outer peripheral surface thereof. Further, each of the first and second divided members 71a and 71b of the brake cam 71 has a positioning protrusion 71d formed on the inner peripheral surfaces thereof. As illustrated in FIGS. 8 and 9, the positioning protrusions 71d are engaged with positioning holes 9d penetrating through the second outer peripheral surface 9c of the bearing accommodating portion 9a. The first gear member 73 is moved together with the brake drum 66 in the spool shaft direction. Therefore, the first gear member 73 has a large thickness to mesh with the second gear member 74 regardless of the position of the moved brake drum 66. The first gear member 73 has, for instance, two cam protrusions 73a on the inner peripheral surface thereof. Each cam protrusion 73a is protruding in a columnar shape and is engaged with the cam groove 71c. The brake drum 66 is rotated and axially moved when the first gear member 73 is rotated while the cam protrusions 73a are engaged with the cam groove 71c.

The second gear member 74 is rotatably supported by a first screw shaft 76 to be screwed and fixed into the rear surface of the first side cover 6a. The third gear member 75 is rotatably supported while being coupled to the operating member 60 in a unitarily rotatable state by a second screw shaft 77 to be screwed and fixed into the rear surface of the first side cover 7a at a position radially outwards of the second gear member 73. The operating member 60 is positioned in any of the operating positions with a plurality of levels (e.g., 6 to 20 levels) by a positioning mechanism 78 including a positioning pin 78a. In the present exemplary embodiment, the operating member 60 is positioned in any of the operating positions of 10 levels. The positioning pin 78a is engaged with any of a plurality of (e.g., ten) recesses (not illustrated in the figures) that are formed on the rear surface of the operating member 60 while being circumferentially disposed at predetermined intervals.

When the operating member 60 is operated and rotated from the operation start position in the clockwise direction, the third gear member 75 is rotated and the first gear member 73 is rotated through the second gear member 74. The brake drum 66 is thereby rotated. It should be noted that the operation start position depicted with a dashed two-dotted line in FIG. 9 is the position of the brake drum 66 under a minimum braking force state. When the operating member 60 is rotated, the brake drum 66 is moved in a direction closer to the spool 12 due to its cam coupling to the brake cam 71. When the operating member 60 is rotated to a maximally operated position, as illustrated with a solid line in FIG. 9, the brake drum 66 is moved to a maximally braked position where the brake drum 66 is located closest to the spool 12. Thus, the braking force of the spool brake device 23 can be regulated with a plurality of levels.

Actions of Spool Brake Device

Figure 15A:
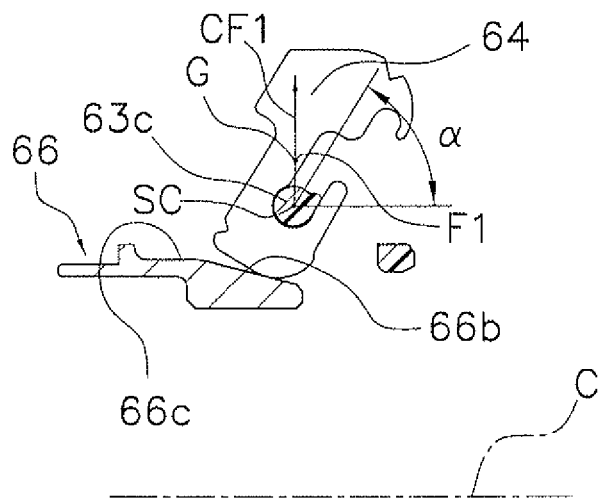
FIG. 15A is a cross-sectional view illustrating a brake shoe position when an operating member is operated and located in a minimally braked position.
Figure 15B:
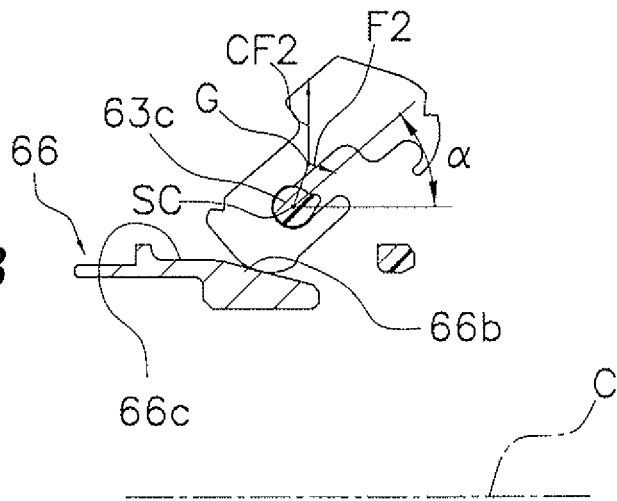
FIG. 15B is a cross-sectional view illustrating a brake shoe position when the operating member is operated and located in an intermediate position.
Figure 15C:
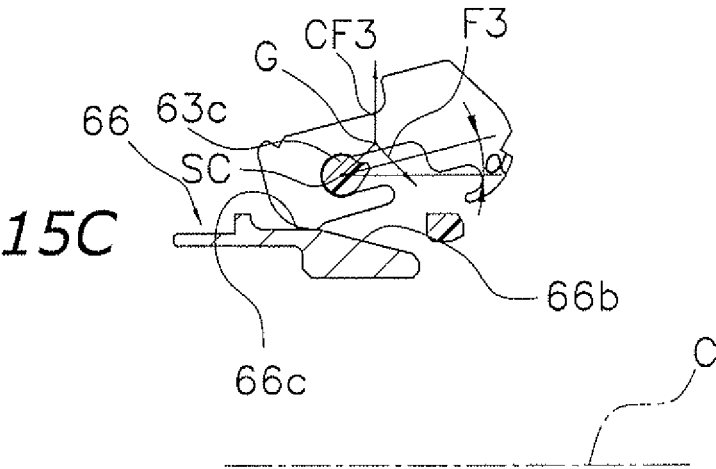
FIG. 15C is a cross-sectional view illustrating a brake shoe position when the operating member is operated and located in a maximally braked position.

In the spool brake device 23, as illustrated in FIG. 15A, when the operating member 60 is located in the operation start position, the contact surfaces 65f of the brake shoes 64 make contact with the small-diameter side part of the tapered surface 66b at positions where pivoting of the brake shoes 64 is restricted by the restricting protrusions 63f. A pivot angle $\alpha$ of each brake shoe 64 is herein maximized. The center-of-gravity G is herein located away from a spool axis C. Therefore, a large centrifugal force CF1 acts on the center-of-gravity G. However, the pivot angle $\alpha$ is thus maximized in the operation start position. Therefore, the centrifugal force C1 has a minute force component F1 directed perpendicularly to a straight line connecting a pivot center SC and the center-of-gravity G. Accordingly, the weakest brake force acts on the brake drum 66. As illustrated in FIG. 15B, when the operating member 60 is located in an intermediate position, the pivot angle $\alpha$ becomes smaller than that when the operating member 60 is located in the operation start position. Therefore, a centrifugal force CF2 becomes smaller than the centrifugal force CF1 in the operation start position. However, a force component F2, which is directed perpendicularly to a straight line connecting the pivot center SC and the center-of-gravity G, becomes larger than the force component F1 in the operation start position. Therefore, the braking force, which presses the brake shoes 64, becomes larger than that in the operation start position. As illustrated in FIG. 15C, when the operating member 60 is located in the maximally braked position, the pivot angle $\alpha$ becomes further smaller than that when the operating member 60 is located in the intermediate position. Therefore, a centrifugal force CF3 becomes smaller than the centrifugal force CF2 in the intermediate position. However, a force component CF3, which is directed perpendicularly to a straight line connecting the pivot center SC and the center-of-gravity G, becomes larger than the force component F2 in the intermediate position. Therefore, the braking force, which presses the brake shoes 64, becomes maximized.

In the spool brake device 23 with the aforementioned structure, when the operating member 60 is operated and rotated from the operation start position in the clockwise direction, the third gear member 75 is rotated in the clockwise direction and the first gear member 73 is rotated through the second gear member 74 in the clockwise direction. It should be noted that FIG. 9 illustrates a state that the operating member 60 is located in the maximally braked position, i.e., an operation end position. Accordingly, the brake drum 66 is rotated and moved, for instance, in a direction away from the spool 12. When the operating member 60 is operated to the maximally braked position, the brake shoes 64 make contact with the parallel surfaces 66c and are set in the maximally braked state as described above. Contrarily, braking force is gradually weakened when the operating member 60 is operated in the counterclockwise direction.

In casting after finishing of braking force regulation, the spool 12 is rotated in the fishing-line releasing direction. When the spool 12 is rotated, centrifugal force acts on the center-of-gravity G of the brake shoes 64. The brake shoes 64 thereby pivot about the axes arranged skew to the spool shaft 16, and the contact surfaces 65f thereof make contact with the outer peripheral surface of the brake drum 66 in regulated positions. Accordingly, the spool 12 is braked by friction between the brake shoes 64 and the brake drum 66. The braking force herein depends on the diameter of the brake drum 66 in the contact position.

The braking force of the spool brake device 23 herein varies in accordance with the gradient of the brake shoes 64 (contact positions on the brake drum 66) not in accordance with centrifugal force. Therefore, braking force can be regulated with a variety of levels. Further, the brake shoes 64 pivot about the axes arranged skew to the spool shall 16. Therefore, increase in spool shaft directional length of the reel can be inhibited. Thus, increase in reel size can be prevented even when the brake shoes 64 are pivotable.

Further, the brake shoes 64 are elastically engaged with the rotary member 62 while being detachable therefrom. Therefore, the brake shoes 64 can be easily replaced even when being configured to pivot.

Other Exemplary Embodiments

An exemplary embodiment of the present invention has been explained above. However, the present invention is not limited to the aforementioned exemplary embodiment, and a variety of changes can be herein made without departing from the scope of the present invention. Especially, a plurality of exemplary embodiments and modifications described in the present specification can be arbitrarily combined on an as-needed basis.

(a) In the present exemplary embodiment, the mass of each first brake shoe 64a and that of each second brake shoe 64b are set to be different from each other based on whether or not a through hole is formed therein. However, the present invention is not limited to the configuration. For example, the mass of each first brake shoe 64a and that of each second brake shoe 64b may be set to be different from each other by an arbitrary mass changing method, for instance, by partially changing the shape thereof, attaching thereto a weight or changing the specific gravity thereof.

Figure 16:
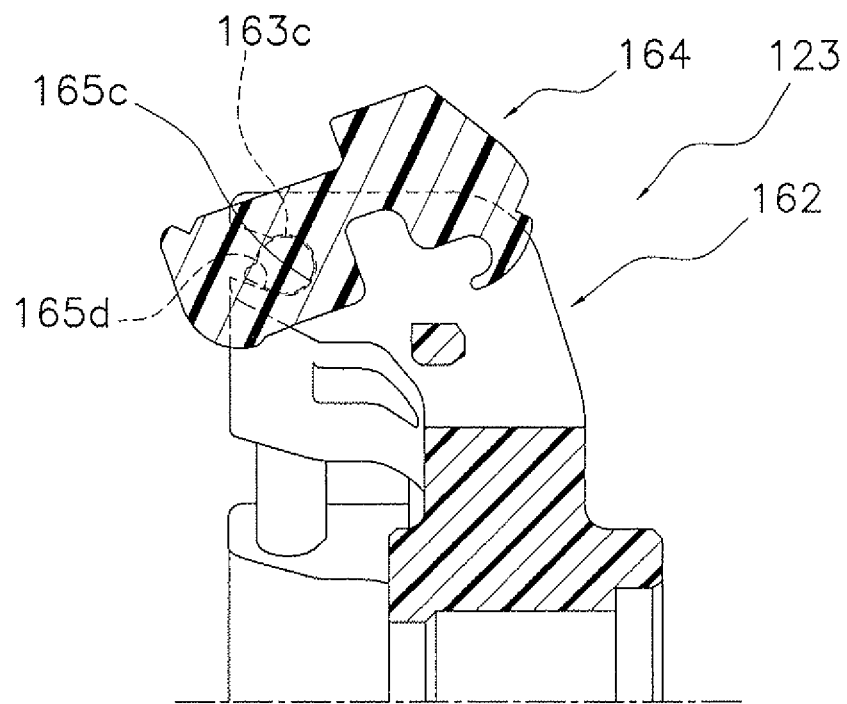
FIG. 16 is a diagram corresponding to FIG. 11 according to another exemplary embodiment.

(b) In the aforementioned exemplary embodiment, the rotary member 62 is provided with the pivot shafts 63c. However, as illustrated in FIG. 16, brake shoes 164 of a spool brake device 123 may be provided with pivot shafts 163c. In this case, a rotary member 162 is preferably made of synthetic resin with elasticity. The rotary member 162 herein has support holes 165c and slits 165d. Alternatively, pivot shafts may be provided separately from brake shoes and a rotary member. When provided as separate elements, the pivot shafts can be elastically engaged with and be attached to or detached from either the brake shoes or the rotary member. Under the condition, brake shoes may be attachable to or detachable. Further, in this case, the pivot shafts and the brake shoes, or alternatively, the rotary member and the pivot shafts may not be elastically engaged with each other. It should be noted that the other structures are the same as those in the aforementioned exemplary embodiment.

Figure 17:
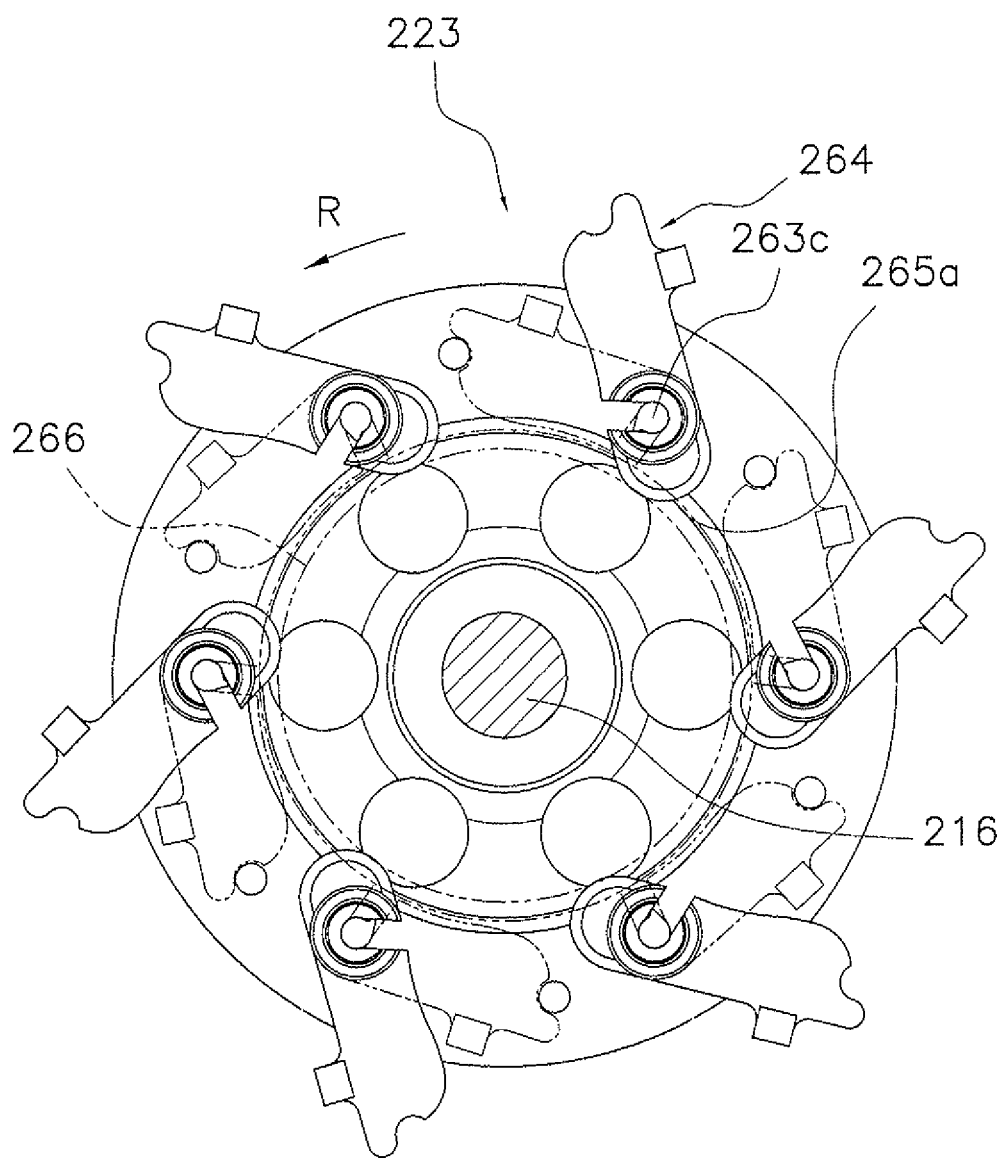
FIG. 17 is a diagram corresponding to FIG. 10 according to yet another exemplary embodiment.

(c) In the aforementioned exemplary embodiment, the brake shoes 64 are pivotably disposed about the axes skew to the spool shaft 16. However, as illustrated in FIG. 17, brake shoes 264 of a spool brake device 223 may be disposed about axes arranged in parallel to a spool shaft 216. Pivot shafts 263c are disposed upright on a rotary member 262 while being disposed in parallel to the spool shaft 216. The pivot shafts 263c are integrally formed with the rotary member 262. In this case, first ends 263a, which make contact with a brake drum 266, are preferably disposed on the rotation-direction-ally upstream side in the fishing-line releasing direction of the spool 12 (depicted with an arrow R).

It should be noted that FIG. 17 illustrates the rotary member 262 seen from the first side cover 6a, unlike FIG. 10 seen from the spool 12. Even in this case, brake shoes with different masses may be disposed. Further, the other structures are similar to those of the aforementioned exemplary embodiment.

(d) In the aforementioned exemplary embodiment, the first brake shoes 64a and the second brake shoes 64b are alternately disposed. However, the present invention is not limited to the structure. All the brake shoes 64 may be the first brake shoes 64a, or alternatively, may be the second brake shoes 64b. Alternatively, at least one of the brake shoes 64 may be either the first brake shoe 64a or the second brake shoe 64b. Yet alternatively, the number of the brake shoes may not be limited to six, and may be arbitrary set as long as at least one brake shoe is provided.

(e) In the aforementioned exemplary embodiment, the rotary member 62 is attached onto the spool shaft 16. Alternatively, the rotary member 62 may be attached to the spool 12. Further, the rotary member 62 is coupled to the spool shaft 16 while being unitarily rotatable therewith. However, a one-way clutch may be disposed between the rotary member 62 and the spool shaft 16 (or the spool 12) and the rotary member 62 may be configured to be unitarily rotated only in the fishing-line releasing direction.

(f) In the aforementioned exemplary embodiment, the brake drum 66 is disposed radially inwards of the pivotable brake shoes 64 in order to regulate braking force with a variety of levels. However, the present invention is not limited to the structure. For example, the brake drum 66 may be disposed radially outwards of the pivotable brake shoes 64. In this case, braking force varies in accordance with centrifugal force.

Features

The aforementioned exemplary embodiments can be described, as follows.

(A) The spool brake device 23 is a device for braking the spool 12 rotatably attached to the reel unit 1 by centrifugal force. The spool brake device 23 includes the rotary member 62, at least one brake shoe 64 and the brake drum 66. The rotary member 62 is rotated in conjunction with at least one rotation of the spool 12 in the fishing-line releasing direction. The brake shoe (or shoes) 64 is elastically engaged with the rotary member 62 while being pivotable and detachable. The brake drum 66 is disposed either radially inwards or radially outwards of the brake shoe (shoes) 64 and has a peripheral surface contactable with the pivotable brake shoe (or shoes) 64.

In the spool brake device 23, when the spool 12 is rotated at least in the fishing-line releasing direction, the rotary member 62 is rotated and the brake shoe (or shoes) 64 pivotably coupled to the rotary member 62 pivots by centrifugal force. Accordingly, the brake shoe (or shoes) 64 makes contact with the brake drum 66 and the spool 12 is thereby braked. The brake shoe (or shoes) 64, which pivots with respect to the rotary member 62, is herein elastically engaged with the rotary member 62 in a detachable state. Therefore, the brake shoe (or shoes) 64 can be easily replaced.

(B) In the spool brake device 23, each brake shoe 64 has the first end 65a and the second end 65b disposed oppositely to the first end 65a. Each brake shoe 64 is coupled to the rotary member 62 while being pivotable about a position between the first end 65a and the center-of-gravity G. The brake drum 66 is disposed radially inwards of the brake shoes 64 and has the outer peripheral surface 66a contactable with the first ends 65a of the brake shoes 64.

In this case, the pivot center SC of each brake shoe 64 is arranged between the center-of-gravity G and the first end 65a making contact with the brake drum 66. In proportion to increase in the pivot angle α by the separation of the second end 65b of each brake shoe 64 from the brake drum 66, the center-of-gravity G is further separated away from the brake drum 66 and centrifugal force is accordingly increased. However, the force component F of centrifugal force, which is directed in the pivot direction perpendicularly to the line connecting the center-of-gravity G and the pivot axis SC, is reduced in proportion to increase in the pivot angle α of each brake shoe 64. Further, a force generated by the moment of the force component in a contact position is directed away from the center of the brake drum 66 in proportion to increase in the pivot angle α of each brake shoe 64. As a result, the braking force, which is directed towards the center of the brake drum 66, is reduced in the contact position. Therefore, braking force greatly varies in accordance with not only the radial position of the center-of-gravity G but also the gradient of each brake shoe 64. Accordingly, stable braking force can be regulated with a variety of levels.

(C) In the spool brake device 23, the brake drum 66 has the tapered surface 66b that is contactable with the first ends 65a of the brake shoes 64 at its portions with different diameters. The spool brake device 23 further includes the moving mechanism 68. The moving mechanism 68 can position the brake shoes 64 and the brake drum 66 while the brake shoes 64 and the brake drum 66 are movable relatively to each other in the axial direction of the spool shaft 16. In this case, the radial position in which the brake shoes 64 make contact with the brake drum 66 is changed in accordance with change of the relative positional relation between the brake drum 66 and the brake shoes 64 in the axial direction. Therefore, braking force can be regulated.

(D) In the spool brake device 23, the rotary member 62 has the pivot shafts 63c to which the brake shoes 64 are coupled. The brake shoes 64 are elastically engaged with the pivot shafts 63c in a pivotable state. In this case, attachment and detachment of the brake shoes 64 can be easily done due to the structure that the brake shoes 64 are elastically engaged with the pivot shafts 63c.

(E) In the spool brake device 23, the brake shoes 64 are made of synthetic resin with elasticity. Each brake shoe 64 has the support hole 65c fitted onto the pivot shaft. 63c and the slit 65d opened with a diameter less than that of the pivot shaft 63 from the inner peripheral surface to the outer peripheral surface of the support hole 65c. In this case, each brake shoe 64 can be elastically engaged with the pivot shaft 63c by fitting the slit 65d of an expanded state onto the pivot shaft 63c. Therefore, the elastically engaging structure can be simplified, and further, specific strength thereof can be kept high.

(F) In the spool brake device 123, each brake shoe 164 has the pivot shaft 163c to be coupled to the rotary member 162. The pivot shaft 163c is elastically engaged with the rotary member 162 in a rotatable state. In this case, each brake shoe 164 is provided with the pivot shaft 163c. Therefore, attachment and detachment of the brake shoes 164 can be easily done and the rotary member 162 can be simply structured.

(G) In the spool brake device 123, the rotary member 162 is made of synthetic resin with elasticity and has the support holes 165c and the slits 165d. Each support hole 165c is fitted onto each pivot shaft 163c, whereas each slit 165d is opened from the inner peripheral surface to the outer peripheral surface of each support hole 165c and has a width less than that of each pivot shaft 163c. In this case, the pivot shafts 163c of the brake shoes 164 are fitted into the support holes 165c while the slits 165d are expanded. The pivot shafts 163c can be thereby elastically engaged with the support holes 165c. Therefore, the elastically engaging structure can be simplified, and further, specific strength thereof can be kept high.

(H) In the spool brake device 23, the support holes 65c are fitted onto the pivot shafts 63c by clearance fit. In this case, pivoting of the brake shoes 64 by centrifugal force is not prevented due to the clearance fit of the support holes 65c onto the pivot shafts 63c.

(I) In the spool brake device 23, each pivot shaft 63c has the restricting protrusion 63f extending radially outwards. The restricting protrusion 63f is engaged with each slit 65d for restricting the pivot range of each brake shoe 64. In this case, the pivot range of each brake shoe 64 can be restricted with a simple structure using each slit 65d.

(J) In the spool brake device 23, each pivot shaft 63c is disposed along the axial direction skew to the spool shaft 16. In this case, each brake shoe 64 pivots about the axis skew to the spool shaft 16. The circumferential space occupied by the brake shoes 64 is thereby reduced, and a large number of the brake shoes 64 can be disposed therein.

(K) In the spool brake device 223, each pivot shaft 263c is disposed along the axis arranged in parallel to the spool shaft 216. In this case, each brake shoe 264 pivots about the axis arranged in parallel to the spool shaft 216. Therefore, the space occupied by the brake shoes 264 in the rotary axis direction is reduced, and increase in size of the dual-bearing reel can be inhibited in the rotary axis direction.

(L) The spool brake device 23 is provided with the plural brake shoes 64. Further, the plural pivot shafts 63c are disposed on the rotary member 62 while being aligned at predetermined intervals in the circumferential direction. In this case, braking force can be regulated with a variety of levels due to the plural brake shoes 64 herein provided.

(M) In the spool brake device 23, the plural brake shoes 64 include at least one first brake shoe 64a and at least one second brake shoe 64b having a mass different from that of the first brake shoe 64a. In this case, the mass of the first brake shoe 64a and that of the second brake shoe 64b are different from each other. Therefore, braking force can be regulated with a more variety of levels.

(N) The spool brake device 23 further includes the on/off switch mechanism 70 configured to switch between the activated state and the deactivated state. At least one of the plural brake shoes 64 is allowed to make contact with the brake drum 66 in the activated state, while being prevented from making contact with the brake drum 66 in the deactivated state.

In this case, the brake shoe (or shoes) 64 can be switched between the activated state and the deactivated state. It is thereby possible to change the number of the brake shoes 64 allowed to make contact with the brake drum 66. Therefore, braking force can be regulated with a more variety of levels by switching the state of the brake shoe (or shoes) 64.

(O) The dual-bearing reel includes the spool brake device 23. In this case, the aforementioned advantageous effects can be achieved in the dual-bearing reel.

ADVANTAGEOUS EFFECTS OF INVENTION

According to the present invention, the brake shoe, which is pivotable with respect to the rotary member, is elastically engaged in a detachable state with the rotary member. Therefore, the brake shoe can be easily replaced.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A dual-bearing reel spool brake device configured to brake a spool being rotatably mounted to a reel unit by centrifugal force, the dual-bearing reel spool brake device comprising:
   a rotary member being configured to be rotated in conjunction with at least rotation of the spool in a fishing-line releasing direction;
   a brake shoe being elastically engaged with the rotary member, the brake shoe being pivotable and detachable with the rotary member; and
   a brake drum being disposed radially inwards or radially outwards of the brake shoe, the brake drum having a peripheral surface contactable with the brake shoe,
   the rotary member having a pivot shaft coupled to the brake shoe, and
   the brake shoe being elastically and pivotally engaged with the pivot shaft.

2. The dual-bearing reel spool brake device according to claim 1, further comprising
   a moving mechanism being configured to relatively move and position the brake shoe and the brake drum in an axial direction of a rotary shaft of the spool,
   wherein the peripheral surface is a tapered surface contactable with the first end of the brake shoe at different diameters.

3. The dual-bearing reel spool brake device according to claim 2, wherein
   the pivot shaft is disposed along an axial direction being skew to the rotary shaft.

4. The dual-bearing reel spool brake device according to claim 2, wherein
   the pivot shaft is disposed along an axial direction in parallel to the rotary shaft.

5. The dual-bearing reel spool brake device according to claim 1, wherein
   the brake shoe is made of synthetic resin having elasticity,
   the brake shoe has a support hole in which the pivot shaft is fitted, and a slit opened from an inner peripheral surface to an outer peripheral surface of the support hole at a width less than a width of the pivot shaft.

6. The dual-bearing reel spool brake device according to claim 5, wherein
   the pivot shaft is fitted in the support hole by clearance fit.

7. The dual-bearing reel spool brake device according to claim 5, wherein
   the pivot shaft has a restricting protrusion extending radially outwards,
   the restricting protrusion is fitted into the slit for restricting a pivot range of the brake shoe.

8. The dual-bearing reel spool brake device according to claim 1, further comprising
   a second brake shoe being elastically engaged with the rotary member, wherein
   the rotary member has a second pivot shaft being coupled to the second brake shoe,
   the second brake shoe is pivotable and detachable with the rotary member
   the first and second pivot shafts are disposed at predetermined intervals in a circumferential direction of the rotary member.

9. The dual-baring reel spool brake device according to claim 8, wherein
   the second brake shoe has mass different from mass of the first brake shoe.

10. The dual-bearing reel spool brake device according to claim 8, further comprising
    a switch mechanism configured to make at least one of the first and second brake shoes to make contact with the brake drum.

11. A dual-bearing reel, comprising:
    the dual-baring reel spool brake device according to claim 1.

12. A dual-bearing reel spool brake device configured to brake a spool being rotatably mounted to a reel unit by centrifugal force, the dual-bearing reel spool brake device comprising:
    a rotary member being configured to be rotated in conjunction with at least rotation of the spool in a fishing-line releasing direction;
    a brake shoe being elastically engaged with the rotary member, the brake shoe being pivotable and detachable with the rotary member, the brake shoe having a first end and a second end being disposed on an opposite side of the first end, and the brake shoe being pivotably coupled to the rotary member at a position between the first end and a center of gravity; and
    a brake drum disposed radially inwards or radially outwards of the brake shoe, the brake drum having a peripheral surface contactable with the brake shoe,
    being disposed radially inwards of the brake shoe, and
    the peripheral surface being an outer peripheral surface contactable with the first end of the brake shoe.

13. A dual-bearing reel spool brake device configured to brake a spool being rotatably mounted to a reel unit by centrifugal force, the dual-bearing reel spool brake device comprising:
    a rotary member being configured to be rotated in conjunction with at least rotation of the spool in a fishing-line releasing direction;

a brake shoe elastically engaged with the rotary member, being pivotable and detachable with the rotary member having a pivot shaft being coupled to the rotary member, and being elastically and rotatably engaged with the rotary member; and a brake drum being disposed radially inwards or radially outwards of the brake shoe, the brake drum having a peripheral surface contactable with the brake shoe.

14. The dual-bearing reel spool brake device according to claim 13, wherein the rotary member is made of synthetic resin having elasticity, the rotary member has a support hole in which the pivot shaft is fitted, and a slit opened from an inner peripheral surface to an outer peripheral surface of the support hole at a width less than a width of the pivot shaft.

* * * * *